(12) United States Patent
Tsou et al.

(10) Patent No.: US 11,028,196 B2
(45) Date of Patent: Jun. 8, 2021

(54) POLYOLEFIN COMPOSITIONS

(71) Applicant: ExxonMobil Chemical Patents Inc., Baytown, TX (US)

(72) Inventors: Andy H. Tsou, Houston, TX (US); Narayanaswami Dharmarajan, Houston, TX (US); Crisita Carmen H. Atienza, Houston, TX (US); Jian Yang, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 16/193,986

(22) Filed: Nov. 16, 2018

(65) Prior Publication Data

US 2019/0194370 A1 Jun. 27, 2019

Related U.S. Application Data

(60) Provisional application No. 62/609,364, filed on Dec. 22, 2017.

(51) Int. Cl.
| | | |
|---|---|---|
| *C08F 210/16* | (2006.01) | |
| *C08F 4/64* | (2006.01) | |
| *C08L 23/08* | (2006.01) | |
| *C08F 295/00* | (2006.01) | |
| *C08F 4/6592* | (2006.01) | |
| *C08L 51/06* | (2006.01) | |
| *C08F 110/02* | (2006.01) | |
| *C08F 290/04* | (2006.01) | |
| *C08F 4/659* | (2006.01) | |

(52) U.S. Cl.
CPC ........ *C08F 210/16* (2013.01); *C08F 4/64189* (2013.01); *C08F 4/65927* (2013.01); *C08F 110/02* (2013.01); *C08F 290/042* (2013.01); *C08F 295/00* (2013.01); *C08L 23/0815* (2013.01); *C08L 51/06* (2013.01); *C08F 4/65904* (2013.01); *C08F 4/65908* (2013.01); *C08F 4/65925* (2013.01)

(58) Field of Classification Search
CPC ...................................................... C08L 51/06
See application file for complete search history.

(56) References Cited

U.S. PATENT DOCUMENTS

| | | |
|---|---|---|
| 8,957,171 B2 | 2/2015 | Giesbrecht et al. |
| 2004/0048984 A1 | 3/2004 | Weng et al. |

(Continued)

FOREIGN PATENT DOCUMENTS

WO 2017/204830 11/2017

OTHER PUBLICATIONS

Markel et al. Macromolecules 33, 8541-8548 (Year: 2000).*

(Continued)

*Primary Examiner* — Mark S Kaucher

(57) ABSTRACT

A composition comprising vinyl-terminated polyethylene having an Mn from about 200 g/mol to about 10,000 g/mol; and a comb polyolefin having polyethylene arms attached to a random copolymer backbone, said backbone including units derived from an alpha-olefin having 3 or more carbon atoms, where the polyethylene arms have an Mn from about 200 g/mol to about 10,000 g/mol, and where the comb polyolefin has an Mp from about 7,500 to about 400,000 g/mol.

6 Claims, 11 Drawing Sheets

(56) References Cited

U.S. PATENT DOCUMENTS

| | | | | |
|---|---|---|---|---|
| 2004/0214953 | A1* | 10/2004 | Yamada | C08L 23/06 |
| | | | | 525/240 |
| 2014/0048984 | A1* | 2/2014 | Enomura | B01F 7/00775 |
| | | | | 264/503 |
| 2017/0081509 | A1 | 3/2017 | Itakuro et al. | |
| 2017/0275409 | A1* | 9/2017 | Tsou | C08F 297/083 |

OTHER PUBLICATIONS

Naim "Polymer Structure and Characterization" (Year: 2007).*
Tsou et al., "Bimodal poly(ethylene-cb-propylene) comb block copolymers from serial reactors: Synthesis and applications as processability additives and blend compatibilizers", Polymer, vol. 104, (2016) pp. 72-82.

\* cited by examiner

POLYOLEFIN COMPOSITIONS

CROSS-REFERENCE OF RELATED APPLICATIONS

This application claims the benefit of Provisional Application No. 62/609,364, filed Dec. 22, 2017, the disclosure of which is incorporated herein by reference.

FIELD OF THE INVENTION

Embodiments of the present invention are directed toward polyolefin compositions that include a vinyl-terminated polyolefin and a comb polyolefin, as well as methods for preparing these compositions by synthesizing the comb polyolefin in the presence of the vinyl-terminated polyolefin.

BACKGROUND OF THE INVENTION

Adhesive compositions are of great use in industry. Hence, there is an interest in the production of adhesive compositions having improved properties.

In a typical adhesive compositions, bond strength is typically obtained from a polymer, such as styrenic block copolymer, that includes rubber blocks. Tackifiers are also used to increase the Tg to improve bond strength and bring the plateau modulus down to an acceptable level by decreasing the polymer chain entanglements. Flow promoters (such as waxes) are used to improve the flow, ensure wetting of the substrate, and allow fast setting of adhesive compositions.

When designing a new adhesive, an important consideration is the Dahlquist criterion. According to the Dahlquist criterion for an adhesive material, a shear compliance of greater than $10^{-7}$ cm$^2$/dyne is required for the adhesive material to be sufficiently soft to conform to the surface of a substrate. This is a key bonding parameter because it is a measure of the adhesive material's wetting capability. A shear compliance greater than $10^{-7}$ cm$^2$/dyne is equivalent to a dynamic shear modulus below 1 MPa or dynamic tensile modulus below 3 MPa (for an incompressible isotropic material, tensile modulus is 3 times of the shear modulus). This dynamic storage modulus, as it is measured using sinusoidal oscillatory loading either in shear or in tension, is called plateau modulus since the adhesive material is at the rubbery plateau (above the glass transition) at its use temperature (typically from 0 to 80° C.).

The rubbery plateau modulus of an amorphous polymeric adhesive comes from the polymer entanglement network, where higher entanglement density (similar to crosslink density) leads to higher plateau modulus. For a semi-crystalline polymeric adhesive, the crystallinity, which can serve as crosslinks (permanent entanglements), further raises the entanglement density and plateau modulus. The entanglement density and the plateau modulus depend on the ratio of the molecular weight (Mw) to the entanglement molecular weight (Me), Mw/Me, provided that the molecular weight is not too high. When the Mw/Me is much greater than 100, then the molecular weight no longer plays a role and the plateau modulus is inversely proportional to Me. In other words, if a polymer has its molecular weight approaching 1,000 kg/mole, the plateau modulus drops with increasing Me independent of molecular weight.

Polyolefins are occasionally used in commercial adhesives. Common approaches for lowering the plateau modulus of these adhesive compositions includes raising the entanglement molecular weight (so at a given molecular weight there is less entanglement) and/or lowering the molecular weight (at a given entanglement MW, less entanglement). As a general trend, the more carbon atoms in the olefinic units, the larger the Me. Indeed, the Me of poly(pentene) or poly(piperylene) (C5) is greater than poly (isobutylene) (C4) which, in turn, is greater than polypropylene (C3). Polyethylene has the lowest Me and is typically not used for adhesives. Larger polyolefins, such as isobutylene copolymers and piperylene copolymers, have been used quite extensively as adhesive materials. These copolymers, however, have low MW, typically less than 10,000 Mn (number average molecular weight). As a result, polyolefin adhesives are very difficult to manufacture due to their low MW and, hence, low viscosity and toughness. These materials can be difficult to extrude and form pellets in manufacturing processes. Often times, special equipment, such as rotoform pastillators, are required to prepare the final adhesive pellets.

Therefore, it would be beneficial if a moderate molecular weight polyolefin that can be made while still possessing low plateau modulus for its uses as adhesives.

SUMMARY OF THE INVENTION

Figure 1:
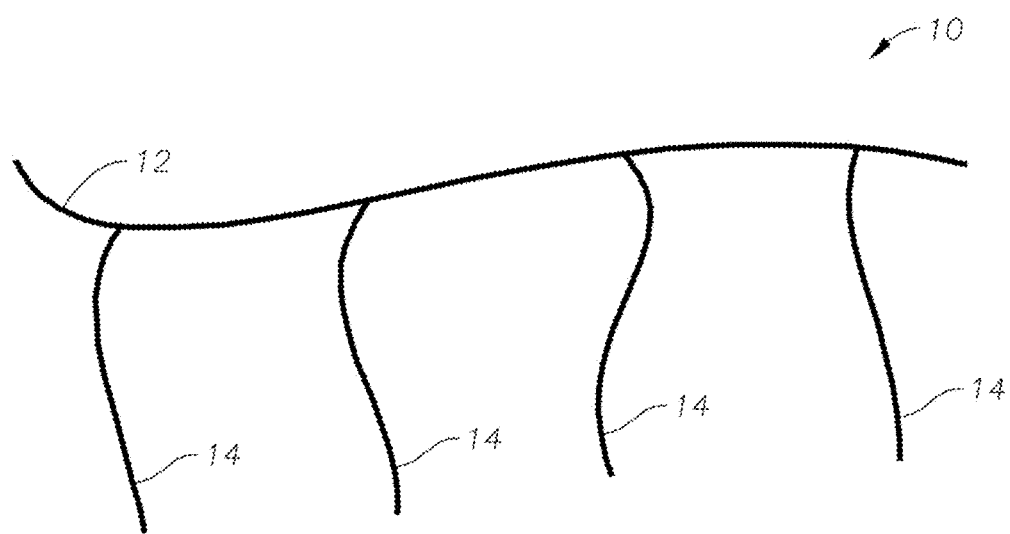
FIG. 1 is a graphical illustration of a comb polymer.

One or more embodiments of the present invention provides a composition comprising vinyl-terminated polyethylene having an Mn from about 200 g/mol to about 10,000 g/mol; and a comb polyolefin having polyethylene arms attached to a random copolymer backbone, said backbone including units derived from an alpha-olefin having 3 or more carbon atoms, where the polyethylene arms have an Mn from about 200 g/mol to about 10,000 g/mol, and where the comb polyolefin has an Mp from about 7,500 to about 400,000 g/mol.

One or more embodiments of the present invention further provides a method of preparing a composition, the method comprising polymerizing ethylene using a first catalyst system that is preferential for the polymerization of ethylene to thereby form vinyl-terminated polyethylene; and copolymerizing alpha-olefin having 3 or more carbon atoms, ethylene, and vinyl-terminated polyethylene using a second catalyst system that is preferential for the copolymerization of the vinyl-terminated polyethylene with alpha-olefin monomer having 3 or more carbon atoms to thereby produce comb polyolefin.

DETAILED DESCRIPTION OF ILLUSTRATIVE EMBODIMENTS

Embodiments of the invention are based, at least in part, on the discovery of an composition that includes a vinyl-terminated polyethylene (VTP) and a comb polyolefin. The comb polyolefin includes a polymer backbone with side chains or "comb arms" attached to the backbone. The composition may be prepared by synthesizing a comb polyolefin in the presence of the VTP. The VTP is prepared by a first catalyst that preferentially polymerizes ethylene. The comb is then prepared by a second catalyst that preferentially co-polymerizes an alpha-olefin having three or more carbon atoms, such as propylene, with ethylene and a portion of the VTP. The resulting bimodal mixture is advantageously useful as an adhesive without the need for added tackifiers or waxes.

Vinyl-Terminated Polyethylene

For purposes of this specification, the terms "polyethylene" and "polyethylene chain" are used to refer to those polymers that are substantially derived from the polymerization of ethylene. Accordingly, the term will refer to polyethylene homopolymer, which is a polymer derived exclusively from the polymerization of ethylene, and polyethylene copolymer, which is a polymer derived from the copolymerization of ethylene with other monomer besides ethylene. These other monomer include, for example, alpha-olefins having 3 or more carbon atoms. Suitable alpha-olefins having 3 or more carbon atoms include C3 to C40 alpha olefins. Exemplary alpha-olefins having 3 or more carbon atoms include, but are not limited to, propylene, butene, pentene, hexene, octene, nonene, decene, undecene, dodecene, and 4-methyl-pentene-1.

The percentage of mer units that are derived from ethylene may be determined by $^{13}C$ NMR. In one or more embodiments, the polyethylene includes at least 50 mol %, in other embodiments at least 55 mol %, in other embodiments at least 60 mol %, and in other embodiments at least 65 mol % ethylene derived mer units. In these or other embodiments, embodiments, the polyethylene may include at most 99 mol %, in other embodiments at most 98 mol %, and in other embodiments at most 97 mol % ethylene derived mer units. In one or more embodiments, the polyethylene may include polyethylene homopolymers with 100 mol % ethylene. In one or more embodiments, the polyethylene may be homopolymer with 100% ethylene, in other embodiments, may include from 55 to about 99 mol %, in other embodiments from about from 60 to about 98 mol % and in other embodiments from about 65 to about 97 mol % ethylene derived mer units. In these or other embodiments, the balance of the mer units of the polyethylene of this invention may be derived from propylene.

In one or more embodiments, the vinyl-terminated polyethylene includes those polyethylene that have a vinyl termination on at least one terminus. The vinyl termination may also be referred to as an allyl chain end, "allylic vinyl end group," "vinyl chain ends" or "vinyl content." In one or more embodiments, the vinyl-terminated polyethylene may be defined by the formula.

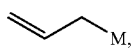

where M represents the polyethylene chain.

In one or more embodiments, the amount of allyl chain ends is determined using $^1H$ NMR at 120° C. using deuterated tetrachloroethane as the solvent on a 500 MHz machine and in selected cases confirmed by $^{13}C$ NMR. Literature values have been reported for proton and carbon assignments where neat perdeuterated tetrachloroethane is used for proton spectra and a 50:50 mixture of normal and perdeuterated tetrachloroethane is used for carbon spectra; all spectra are recorded at 100° C. on a BRUKER AM 300 spectrometer operating at 300 MHz for proton and 75.43 MHz for carbon, for vinyl terminated propylene oligomers, as in *J. American Chemical Soc.*, 114, 1992, pp. 1025-1032.

In one or more embodiments, the vinyl-terminated polyethylene has at least 40%, in other embodiments at least 60%, and in other embodiments at least 80% allyl chain ends (relative to total polyethylenes). In these or other embodiments, the vinyl-terminated polyethylene has at most 99%, in other embodiments at most 95%, and in other embodiments at most 90% allyl chain ends. In one or more embodiments, the vinyl-terminated polyethylene has from about 40% to about 99%, in other embodiments from about 60% to about 95%, and in other embodiments from about 80% to about 90% allyl chain ends.

In one or more embodiments, the vinyl-terminated polyethylene include a significant amount of vinyl termination, which is defined as a ratio of vinyl groups per molecule of greater than or equal to 0.2. In an embodiment, the polyethylene include a ratio of vinyl groups per molecule of greater than or equal to 0.5, or 0.7, or 0.8, or 0.9, or 0.95, when determined according to the description provided in the *J. American Chemical Soc.*, 114, 1992, pp. 1025-1032, or an equivalent thereof.

Vinyl terminated polymers typically have a saturated chain end, also referred to as a methyl end. In polymerizations comprising $C_4$ or greater monomers (or "higher olefin" monomers), the saturated chain end may be a $C_4$ or greater (or "higher olefin") chain end, as shown in the formula below:

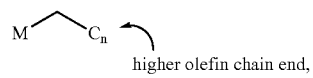

higher olefin chain end, where M represents the polyethylene chain and n is an integer selected from 4 to 40. This is especially true when there is substantially no ethylene or propylene in the polymerization. In an ethylene/($C_4$ or greater monomer) copolymerization, the polymer chain may initiate growth in an ethylene monomer, thereby generating a saturated chain end which is an ethyl chain end. In polymerizations where propylene is present, the polymer chain may initiate growth in a propylene monomer, thereby generating an isobutyl chain end. An "isobutyl chain end" is defined to be an end or terminus of a polymer, represented as shown in the formula below:

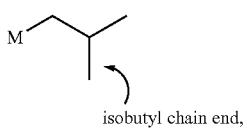
isobutyl chain end, where M represents the polyethylene chain. Isobutyl chain ends are determined according to the procedure set out in WO 2009/155471.

Unless otherwise indicated, the distribution and the moments of molecular weight (Mp, Mw, Mn, Mz, Mw/Mn, etc.), the comonomer content (C2, C3, C6, etc.), and the branching index (g') are determined by using a high temperature Gel Permeation Chromatography (Polymer Char GPC-IR) equipped with a multiple-channel band-filter based Infrared detector IR5, an 18-angle light scattering detector and a viscometer. Three Agilent PLgel 10-μm Mixed-B LS columns are used to provide polymer separation. Aldrich reagent grade 1,2,4-trichlorobenzene (TCB) with 300 ppm antioxidant butylated hydroxytoluene (BHT) is used as the mobile phase. The TCB mixture is filtered through a 0.1-μm Teflon filter and degassed with an online degasser before entering the GPC instrument. The nominal flow rate is 1.0 ml/min and the nominal injection volume is 200 μL. The whole system including transfer lines, columns, and detectors are contained in an oven maintained at 145° C. Given amount of polymer sample is weighed and sealed in a standard vial with 80-μL flow marker (Heptane) added to it. After loading the vial in the autosampler, polymer is automatically dissolved in the instrument with 8 ml added TCB solvent. The polymer is dissolved at 160° C. with continuous shaking for about 1 hour for most polyethylene samples or 2 hours for polypropylene samples. The TCB densities used in concentration calculation are 1.463 g/ml at room temperature and 1.284 g/ml at 145° C. The sample solution concentration is from 0.2 to 2.0 mg/ml, with lower concentrations being used for higher molecular weight samples. The concentration (c), at each point in the chromatogram is calculated from the baseline-subtracted IR5 broadband signal intensity (I), using the following equation: c=βI, where β is the mass constant. The mass recovery is calculated from the ratio of the integrated area of the concentration chromatography over elution volume and the injection mass which is equal to the pre-determined concentration multiplied by injection loop volume. The conventional molecular weight (IR MW) is determined by combining universal calibration relationship with the column calibration which is performed with a series of monodispersed polystyrene (PS) standards ranging from 700 to 10M gm/mole. The MW at each elution volume is calculated with following equation:

$$\log M = \frac{\log(K_{PS}/K)}{\alpha+1} + \frac{\alpha_{PS}+1}{\alpha+1}\log M_{PS},$$

where the variables with subscript "PS" stand for polystyrene while those without a subscript are for the test samples. In this method, $\alpha_{PS}$=0.67 and $K_{PS}$=0.000175, while α and K for other materials are as calculated and published in literature (Sun, T. et al. Macromolecules 2001, 34, 6812), except that for purposes of this invention and claims thereto, α=0.695 and K=0.000579 for linear ethylene polymers, α=0.705 and K=0.0002288 for linear propylene polymers, α=0.695 and K=−0.000181 for linear butene polymers, α is 0.695 and K is 0.000579*(1−0.0087*w2b+0.000018*(w2b)^2) for ethylene-butene copolymer where w2b is a bulk weight percent of butene comonomer, α is 0.695 and K is 0.000579*(1-0.0075*w2b) for ethylene-hexene copolymer where w2b is a bulk weight percent of hexene comonomer, and α is 0.695 and K is 0.000579*(1-0.0077*w2b) for ethylene-octene copolymer where w2b is a bulk weight percent of octene comonomer. Concentrations are expressed in g/cm³, molecular weight is expressed in g/mole, and intrinsic viscosity (hence K in the Mark-Houwink equation) is expressed in dL/g unless otherwise noted.

The comonomer composition is determined by the ratio of the IR5 detector intensity corresponding to $CH_2$ and $CH_3$ channel calibrated with a series of PE and PP homo/copolymer standards whose nominal value are predetermined by NMR or FTIR. In particular, this provides the methyls per 1000 total carbons ($CH_3$/1000TC) as a function of molecular weight. The short-chain branch (SCB) content per 1000TC (SCB/100TC) is then computed as a function of molecular weight by applying a chain-end correction to the $CH_3$/1000TC function, assuming each chain to be linear and terminated by a methyl group at each end. The weight % comonomer is then obtained from the following expression in which f is 0.3, 0.4, 0.6, 0.8, and so on for C3, C4, C6, C8, and so on co-monomers, respectively:

$$w2=f*SCB/1000TC.$$

The bulk composition of the polymer from the GPC-IR and GPC-4D analyses is obtained by considering the entire signals of the $CH_3$ and $CH_2$ channels between the integration limits of the concentration chromatogram. First, the following ratio is obtained $$\text{Bulk } IR \text{ ratio} = \frac{\text{Area of } CH_3 \text{ signal within integration limits}}{\text{Area of } CH_2 \text{ signal within integration limits}}.$$

Then the same calibration of the $CH_3$ and $CH_2$ signal ratio, as mentioned previously in obtaining the $CH_3$/1000TC as a function of molecular weight, is applied to obtain the bulk $CH_3$/1000TC. A bulk methyl chain ends per 100TC (bulk $CH_3$end/1000TC) is obtained by weight-averaging the chain-end correction over the molecular-weight range. Then $$w2b=f*\text{bulk CH3/1000TC}$$

bulk SCB/1000TC=bulk CH3/1000TC−bulk CH3end/1000TC and bulk SCB/100TC is converted to bulk w2 in the same manner as described above.

The LS detector is the 18-angle Wyatt Technology High Temperature DAWN HELEOSII. The LS molecular weight (M) at each point in the chromatogram is determined by analyzing the LS output using the Zimm model for static light scattering (*Light Scattering from Polymer Solutions*; Huglin, M. B., Ed.; Academic Press, 1972):

$$\frac{K_o c}{\Delta R(\theta)} = \frac{1}{MP(\theta)} + 2A_2 c.$$

Here, $\Delta R(\theta)$ is the measured excess Rayleigh scattering intensity at scattering angle θ, c is the polymer concentration determined from the IR5 analysis, $A_2$ is the second virial coefficient, $P(\theta)$ is the form factor for a monodisperse random coil, and $K_O$ is the optical constant for the system:

$$K_o = \frac{4\pi^2 n^2 (dn/dc)^2}{\lambda^4 N_A},$$

where $N_A$ is Avogadro's number, and (dn/dc) is the refractive index increment for the system. The refractive index, n=1.500 for TCB at 145° C. and λ=665 nm. For analyzing polyethylene homopolymers, ethylene-hexene copolymers, and ethylene-octene copolymers, dn/dc=0.1048 ml/mg and $A_2$=0.0015; for analyzing ethylene-butene copolymers, dn/dc=0.1048*(1−0.00126*w2) ml/mg and $A_2$=0.0015 where w2 is weight percent butene comonomer.

A high temperature Agilent (or Viscotek Corporation) viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_S$, for the solution flowing through the viscometer is calculated from their outputs. The intrinsic viscosity, [η], at each point in the chromatogram is calculated from the equation $[\eta]=\eta_S/c$, where c is concentration and is determined from the IR5 broadband channel output. The viscosity MW at each point is calculated as $M=K_{PS}M^{\alpha_{PS}+1}/[\eta]$, where $\alpha_{ps}$ is 0.67 and $K_{ps\ is}$ 0.000175.

The branching index ($g'_{vis}$) is calculated using the output of the GPC-IR5-LS-VIS method as follows. The average intrinsic viscosity, $[\eta]_{avg}$, of the sample is calculated by:

$$[\eta]_{avg} = \frac{\sum c_i [\eta]_i}{\sum c_i},$$

where the summations are over the chromatographic slices, i, between the integration limits. The branching index $g'_{vis}$ is defined as $$g'_{vis} = \frac{[\eta]_{avg}}{KM_v^\alpha},$$

where $M_V$ is the viscosity-average molecular weight based on molecular weights determined by LS analysis and the K and α are for the reference linear polymer, which are, for purposes of this invention and claims thereto, α=−0.695 and K=−0.000579 for linear ethylene polymers, α=−0.705 and K=−0.0002288 for linear propylene polymers, α=−0.695 and K=−0.000181 for linear butene polymers, α is 0.695 and K is 0.000579*(1−0.0087*w2b+0.000018*(w2b)^2) for ethylene-butene copolymer where w2b is a bulk weight percent of butene comonomer, α is 0.695 and K is 0.000579*(1−0.0075*w2b) for ethylene-hexene copolymer where w2b is a bulk weight percent of hexene comonomer, and α is 0.695 and K is 0.000579*(1−0.0077*w2b) for ethylene-octene copolymer where w2b is a bulk weight percent of octene comonomer. Concentrations are expressed in g/cm³, molecular weight is expressed in g/mole, and intrinsic viscosity (hence K in the Mark-Houwink equation) is expressed in dL/g unless otherwise noted. Calculation of the w2b values is as discussed above.

Mn (¹H NMR), especially for the VTP, may also be determined according to the following NMR method. ¹H NMR data is collected at either room temperature or 120° C. (for purposes of the claims, 120° C. shall be used) in a 5 mm probe using a Varian spectrometer with a ¹H frequency of 250 MHz, 400 MHz, or 500 MHz (for the purpose of the claims, a proton frequency of 400 MHz is used). Data are recorded using a maximum pulse width of 45° C., 8 seconds between pulses and signal averaging 120 transients. Spectral signals are integrated and the number of unsaturation types per 1000 carbons are calculated by multiplying the different groups by 1000 and dividing the result by the total number of carbons. Mn is calculated by dividing the total number of unsaturated species into 14,000, and has units of g/mol. The chemical shift regions for the olefin types are defined to be between the following spectral regions.

| Unsaturation Type | Region (ppm) | Number of hydrogens per structure |
|---|---|---|
| Allylic Vinyl | 4.95-5.10 | 2 |
| Vinylidene | 4.70-4.84 | 2 |
| Disubstituted Vinylene | 5.31-5.55 | 2 |
| Trisubstituted Vinylene | 5.11-5.30 | 1 |

In one or more embodiments, the vinyl-terminated polyethylene may have a Mn of at least 200 g/mole, in other embodiments at least 1,000 g/mole, in other embodiments at least 1,500 g/mole, in other embodiments at least 2,000 g/mole, and in other embodiments at least 2,500 g/mole. In these or embodiments, the vinyl-terminated polyethylene may have a Mn of at most 10,000 g/mole, in other embodiments at most 8,000 g/mole, and in other embodiments at most 6,000 g/mole. In one or more embodiments, vinyl-terminated polyethylene may have a Mn from about 200 g/mole to about 10,000 g/mole, in other embodiments from about 1,000 g/mole to about 8,000 g/mole, and in other embodiments from about 1,500 g/mole to about 6,000 g/mole. In these or other embodiments, the vinyl-terminated polyethylene may have a Mw/Mn from about 1 to about 10, in other embodiments from about 1.2 to about 8, in other embodiments from about 1.3 to about 7.5, in other embodiments from about 1.4 to about 5, in other embodiments from about 1.5 to about 4, and in other embodiments from about 1.5 to about 3.

The vinyl-terminated polyethylene may be branched or unbranched. In one or more embodiments, the vinyl terminated polyolefin has a branching index, $g'_{vis}$ (as determined by GPC), of 0.98 or less, alternately 0.96 or less, alternately 0.95 or less, alternately 0.93 or less, alternately 0.90 or less.

Comb Polyolefin

As indicated above, the composition also includes a comb polyolefin. With reference to FIG. 1, a comb polyolefin 10 includes a backbone 12 and a plurality of comb arms 14. In one or more embodiments, the comb polyolefin has polyethylene arms attached to a random polyolefin copolymer backbone that includes units derived from an alpha-olefin having 3 or more carbon atoms. As indicated above, the arms of the comb polyolefin may be prepared from the vinyl-terminated ethylene.

Alternatively, the comb polyolefin may be defined by the following formula

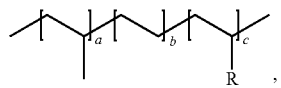

where R is a polyethylene chain, and a, b, and c represent randomly distributed mer units with the a units deriving from the copolymerization of propylene, the b units deriving from the copolymerization of ethylene, and the c units deriving from the copolymerization of vinyl-terminated polyethylene.

In one or more embodiments, the comb polyolefin may derive from the polymerization of ethylene and an alpha-olefins having 3 or more carbon atoms. Suitable alpha-olefins having 3 or more carbon atoms include C3 to C40 alpha olefins. Exemplary alpha-olefins having 3 or more carbon atoms include, but are not limited to, propylene, butene, pentene, hexene, octene, nonene, decene, undecene, dodecene, and 4-methyl-pentene-1.

In one or more embodiments, the comb polyolefin may be characterized by the backbone percentage of polymerized alpha-olefins having 3 or more carbon atoms, which may be determined by $^{13}$C NMR. In one or more embodiments, the molar percentage of the units in the backbone that are derived from alpha-olefins having 3 or more carbon atoms may be at least 40 mol %, in other embodiments at least 50 mol %, and in other embodiments at least 65 mol %. In these or other embodiments, the backbone includes at most 95 mol %, in other embodiments at most 90 mol %, and in other embodiments at most 85 mol % units derived from alpha-olefins having 3 or more carbon atoms. In one or more embodiments, the backbone includes from about 40 to about 95 mol %, in other embodiments from about 50 to about 90 mol %, and in other embodiments from about 65 to about 85 mol % units derived from alpha-olefins having 3 or more carbon atoms. In these or other embodiments, the balance of the comb polyolefin may be derived from ethylene.

While the backbone of the comb polyolefin includes polymerized alpha-olefins having 3 or more carbon atoms and residues from the polymerization of the vinyl-terminated polyethylene, in certain embodiments the backbone may also include units derived from the polymerization of ethylene. In one or more embodiments, the comb polyolefin may be characterized by the percentage of polymerized ethylene, which may be determined by $^{13}$C NMR. In one or more embodiments, the molar percentage of the units in the backbone that are derived from ethylene may be at least 5 mol %, in other embodiments at least 10 mol %, and in other embodiments at least 15 mol % ethylene. In these or other embodiments, the backbone is at most 40 mol %, in other embodiments at most 35 mol %, and in other embodiments at most 30 mol % ethylene-derived units. In one or more embodiments, the backbone includes from about 5 to about 40 mol %, in other embodiments from about 10 to about 35 mol %, and in other embodiments from about 15 to about 30 mol % ethylene-derived units.

In one or more embodiments, the backbone of the comb polyolefin may have an isotactic microstructure, which may be determined by $^{13}$C NMR. In one or more embodiments, the molar percentage of mer units in the comb polyolefin back that are in an isotactic configuration on a mole basis may be at least 30 mol %, in other embodiments at least 35 mol %, and in other embodiments at least 40 mol %. In these or other embodiments, the molar percentage of mer units in the comb polyolefin back that are in an isotactic configuration on a mole basis may be at most 90 mol %, in other embodiments at least 85 mol %, and in other embodiments at least 80 mol %. In one or more embodiments, the molar percentage of mer units in the comb polyolefin backbone that are in an isotactic configuration may be from about 30 to about 90 mol %, in other embodiments may be from about 35 to about 85 mol %, and in other embodiments may be from about 40 to about 80 mol %.

In one or more embodiments, the comb polyolefin may have a peak molecular weight (Mp), which is determined by 4D GPC as described above, of at least 7,500 g/mole, in other embodiments at least 10,000 g/mole, in other embodiments at least 12,500 g/mole, in other embodiments at least 15,000 g/mole, and in other embodiments at least 20,000 g/mole. In these or embodiments, the comb polyolefin may have a Mp of at most 400,000 g/mole, in other embodiments at most 350,000 g/mole, in other embodiments at most 300,000 g/mole, in other embodiments at most 250,000 g/mole, and in other embodiments at most 200,000 g/mole. In one or more embodiments, comb polyolefin may have a Mp from about 7,500 g/mole to about 400,000 g/mole, in other embodiments from about 10,000 g/mole to about 350,000 g/mole, in other embodiments from about 12,500 g/mole to about 300,000 g/mole, in other embodiments from about 15,000 g/mole to about 250,000 g/mole, and in other embodiments from about 20,000 g/mole to about 200,000 g/mole.

The comb polyolefin may be characterized by its branching index, $g'_{vis}$, which can insight into the number of comb arms extending from the backbone of the molecule. In one or more embodiments, the comb polyolefin has a branching index, $g'_{vis}$ (as determined by GPC), of less than 0.9, in other embodiments less than 0.8, in other embodiments less than 0.7, in other embodiments less than 0.6, in other embodiments less than 0.5, and in other embodiments less than 0.4.

Blends

As indicated above, the compositions of the invention include the vinyl-terminated polyethylene and the comb polyolefin. In one or more embodiments, the vinyl-terminated polyethylene and the comb polyolefin are a blend or otherwise intimate mixture of the two polymers resulting from synthesizing the comb polyolefin in the presence of the vinyl-terminated polyethylene, which will be discussed in greater detail below. In one or more embodiments, the blend is a bimodal polymeric blend.

The amount of the vinyl-terminated polyethylene and the comb polyolefin may be characterized by the weight percentage of the vinyl-terminated polyethylene in the blend, which may be determined by 4D GPC as described above. In one or more embodiments, the blend includes at least 5 wt %, in other embodiments at least 10 wt %, and in other embodiments at least 15 wt %, vinyl-terminated polyethylene, based upon the entire weight of the blend. In these or other embodiments, the blend includes at most 50 wt %, in other embodiments at most 45 wt %, and in other embodiments at most 40 wt %, vinyl-terminated polyethylene, based upon the entire weight of the blend. In one or more embodiments, the blend includes from about 5 to about 50 wt %, in other embodiments from about 10 to about 45 wt %, and in other embodiments from about 15 to about 40 wt %, vinyl-terminated polyethylene, based upon the entire weight of the blend. In one or more embodiments, the balance of the blend includes the comb polyolefin. In other words, the blend may include at least 50 wt %, in other embodiments at least 55 wt %, and in other embodiments at least 60 wt %, comb polyolefin, based upon the entire weight of the blend. In these or other embodiments, the blend includes at most 95 wt %, in other embodiments at most 90 wt %, and in other embodiments at most 85 wt %, comb polyolefin, based upon the entire weight of the blend. In one or more embodiments, the blend includes from about 50 to about 95 wt %, in other embodiments from about 55 to about 90 wt %, and in other embodiments from about 60 to about 85 wt %, comb polyolefin based upon the entire weight of the blend.

Synthesis of Polymers

As indicated above, the blend of the vinyl-terminated polymer (VTP) and the comb polyolefin may be prepared by synthesizing the comb polyolefin in the presence of the VTP. In one or more embodiments, VTP is prepared by polymerizing monomer, which includes ethylene, with a first catalyst system that is preferential for the polymerization of ethylene and is preferential for the beta-hydride transfer leading to vinyl chain ends. Then, in the presence of the VTP, the comb polyolefin is prepared by copolymerizing alpha-olefins having 3 or more carbon atoms, VTP, optionally ethylene, and optionally other comonomer, with a second catalyst system. This second catalyst preferentially polymerizes alpha-olefins having 3 or more carbon atoms, and preferably produces isotactic-rich sequences while incorporating the VTPs. Advantageously, the same activator used in the first catalyst system may be used in the second catalyst system.

Suitable alpha-olefins having 3 or more carbon atoms include C3 to C40 alpha olefins. Exemplary alpha-olefins having 3 or more carbon atoms include, but are not limited to, propylene, butene, pentene, hexene, octene, nonene, decene, undecene, dodecene, and 4-methyl-pentene-1. In particular embodiments, comb polyolefin is prepared by copolymerizing propylene, VTP, optionally ethylene, and optionally other comonomer.

First Catalyst System

As indicated above, the catalyst system that preferentially polymerizes ethylene may be referred to as the first catalyst system. In one or more embodiments, the first catalyst system may include group 3, 4, 5 and/or 6 metal disubstituted compounds supported by a tetradentate di-anionic salan ligand. Suitable catalyst systems for use as the first catalyst are described in U.S. Pat. No. 8,957,171, which is incorporated herein by reference. As will be described in greater detail below, the catalyst systems may also include other constituents such as, but not limited to, activators.

In one or more embodiments, the group 3, 4, 5 and/or 6 metal disubstituted compounds supported by a tetradentate di-anionic salan ligand, which may simply be referred to as a metal-salan compound or catalyst, may be represented by the formula:

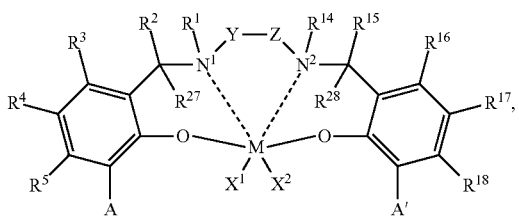

wherein:
A and A' are heteroaryl radicals;
M is a Group 3, 4, 5 or 6 transition metal;
each X is, independently, a univalent $C_1$ to $C_{20}$ hydrocarbyl radical, a functional group comprising elements from Groups 13-17 of the periodic table of the elements, or $X^1$ and $X^2$ join together to form a $C_4$ to $C_{62}$ cyclic or polycyclic ring structure, provided, however, where M is trivalent then $X^2$ is not present;

each $R^1$, $R^2$, $R^3$, $R^4$, $R^5$, $R^{14}$, $R^{15}$, $R^6$, $R^{17}$, $R^{18}$, $R^{27}$, and $R^{28}$ is, independently, a hydrogen, a $C_1$-$C_{40}$ hydrocarbyl radical, a functional group comprising elements from Group 13-17 of the periodic table of the elements, or two or more of $R^1$ to $R^{21}$ may independently join together to form a $C_4$ to $C_{62}$ cyclic or polycyclic ring structure, or a combination thereof; and Y and Z together form a divalent $C_1$ to $C_{20}$ hydrocarbyl radical.

In an embodiment, A and A' each comprise carbazole radicals.

In an embodiment, the catalyst metal compounds are represented by the following structure:

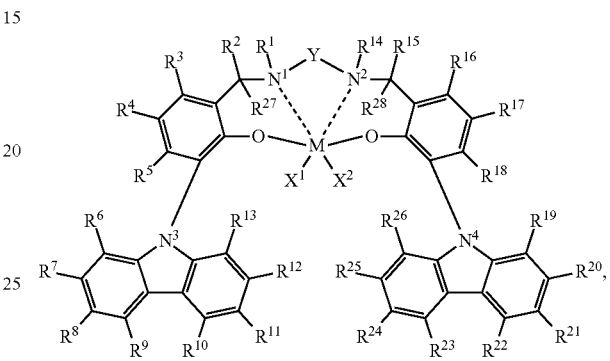

where:
each solid line represents a covalent bond and each dashed line represents a bond having varying degrees of covalency and a varying degree of coordination;

M is a Group 3, 4, 5 or 6 transition metal covalently bonded to each oxygen atom, and bonded with varying degrees of covalency and coordination to each of nitrogen atoms $N^1$ and $N^2$;

each X is, independently, a univalent $C_1$ to $C_{20}$ hydrocarbyl radical, a functional group comprising elements from Groups 13-17 of the periodic table of the elements, or $X^1$ and $X^2$ join together to form a $C_4$ to $C_{62}$ cyclic or polycyclic ring structure;

each $R^1$, $R^2$, $R^3$, $R^4$, $R^5$, $R^6$, $R^7$, $R^8$, $R^9$, $R^{10}$, R, $R^{12}$, $R^{13}$, $R^{14}$, $R^{15}$, $R^{16}$, $R^{17}$, $R^8$, $R^{19}$, $R^{20}$, $R^{21}$, $R^{22}$, $R^2$, $R^{24}$, $R^{25}$, $R^{26}$, $R^2$ and $R^{28}$ is, independently, a hydrogen, a $C_1$-$C_{40}$ hydrocarbyl, a functional group comprising elements from Group 13-17 of the periodic table of the elements, or independently, may join together to form a C4 to C62 cyclic or polycyclic ring structure, or a combination thereof; and Y is a divalent hydrocarbyl radical covalently bonded to and bridging between both of the nitrogen atoms $N^1$ and $N^2$. In an embodiment, two or more of $R^1$ to $R^{28}$ may independently join together to form a $C_4$ to $C_{62}$ cyclic or polycyclic ring structure.

In an embodiment, M is a Group 4 metal, or M is Hf, Ti and/or Zr, or M is Hf or Zr. In an embodiment, each of $X^1$ and $X^2$ is independently selected from the group consisting of hydrocarbyl radicals having from 1 to 20 carbon atoms, hydrides, amides, alkoxides having from 1 to 20 carbon atoms, sulfides, phosphides, halides, amines, phosphines, ethers, and combinations thereof.

In an embodiment, $X^1$ and $X^2$ together form a part of a fused ring or a ring system having from 4 to 62 carbon atoms.

In an embodiment, each of $X^1$ and $X^2$ is independently selected from the group consisting of halides, alkyl radicals having from 1 to 7 carbon atoms, benzyl radicals, or a combination thereof.

In an embodiment, Y is a divalent $C_1$-$C_{20}$ hydrocarbyl radical comprising a portion that comprises a linker backbone comprising from 1 to 18 carbon atoms linking or bridging between nitrogen atoms $N^1$ and $N^2$. In an embodiment, Y is a $C_1$-$C_{20}$ hydrocarbyl radical comprising a portion that comprises a linker backbone comprising from 1 to 18 carbon atoms linking the nitrogen atoms $N^1$ and $N^2$ wherein the hydrocarbyl comprises O, S, S(O), S(O)$_2$, Si(R*)$_2$, P(R*) or N(R*), wherein each R* is independently a $C_1$-$C_{18}$ hydrocarbyl. In an embodiment, Y is selected from the group consisting of ethylene (—H$_2$CH$_2$—) and 1,2-cyclohexylene, and/or —CH$_2$CH$_2$CH$_2$— derived from propylene. In an embodiment, Y is —CH$_2$CH$_2$CH$_2$— derived from propylene.

In an embodiment, each X is, independently, a halogen or a $C_1$ to C7 hydrocarbyl radical.

In an embodiment, each X is a benzyl radical. In an embodiment, each $R^1$, $R^2$, $R^3$, $R^4$, $R^5$, $R^6$, $R^7$, $R^8$, $R^9$, $R^{10}$, R, $R^{12}$, $R^{13}$, $R^{14}$, $R^{15}$, $R^{16}$, $R^{17}$, $R^{18}$, $R^{19}$, $R^{20}$, $R^{21}$, $R^2$, $R^{23}$ $R^{24}$, $R^5$, $R^{26}$, $R^{27}$, and $R^{28}$ is, independently, hydrogen, a halogen, or a $C_1$ to $C_{30}$ hydrocarbyl radical, or a $C_1$ to $C_{10}$ hydrocarbyl radical. In an embodiment, one or more of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$ $R^{24}$, $R^{25}$, $R^{26}$, $R^{27}$, and $R^{28}$ is a methyl radical, a fluoride, or a combination thereof.

In an embodiment, M is Zr; $X^1$ and $X^2$ are benzyl radicals; $R^1$ and $R^{14}$ are methyl radicals; $R^2$ through $R^{13}$ and $R^{15}$ through $R^{28}$ are hydrogen; and Y is ethylene (—CH$_2$CH$_2$—).

In an embodiment, M is Zr; $X^1$ and $X^2$ are benzyl radicals; $R^1$, $R^4$, $R^{14}$ and $R^{17}$ are methyl radicals; $R^2$, $R^3$, $R^5$ through $R^{13}$, $R^{15}$, $R^{16}$ and $R^{18}$ through $R^{28}$ are hydrogen; and Y is ethylene (—CH$_2$CH$_2$—).

In an embodiment, M is Zr; $X^1$ and $X^2$ are benzyl radicals; $R^1$ and $R^{14}$ are methyl radicals; $R^4$ and $R^{17}$ are fluoro (F) functional groups; $R^2$, $R^3$, $R^5$ through $R^{13}$, $R^{15}$, $R^{16}$ and $R^{18}$ through $R^{28}$ are hydrogen; and Y is ethylene (—CH$_2$CH$_2$—).

In an embodiment, M is Zr; $X^1$ and $X^2$ are benzyl radicals; $R^1$, $R^4$, $R^{14}$ and $R^{17}$ are methyl radicals; $R^8$, $R^{11}$, $R^{21}$ and $R^{24}$ are tert-butyl radicals; $R^2$, $R^3$, $R^5$, $R^6$, $R^7$, $R^9$, $R^{11}$, $R^{12}$, $R^{13}$, $R^{15}$, $R^{16}$, $R^{18}$, $R^{19}$, $R^{20}$, $R^{22}$, $R^{23}$, $R^2$, $R^{26}$, $R^{27}$, and $R^{28}$ are hydrogen; and Y is ethylene (—CH$_2$CH$_2$—).

In an embodiment, M is Zr; $X^1$ and $X^2$ are benzyl radicals; $R^1$, $R^4$, $R^{14}$ and $R^{17}$ are methyl radicals; $R^8$, $R^{11}$, $R^{21}$ and $R^{24}$ are mesityl radicals; $R^2$, $R^3$, $R^5$, $R^6$, $R^7$, $R^9$, $R^{11}$, $R^{12}$, $R^{13}$, $R^{15}$, $R^{16}$, $R^{18}$, $R^{19}$, $R^{20}$, $R^{22}$, $R^{23}$, $R^2$, $R^{26}$, $R^{27}$, and $R^{28}$ are hydrogen; and Y is ethylene (—CH$_2$CH$_2$—).

Second Catalyst System

As indicated above, the catalyst system that preferentially polymerizes alpha-olefin having 3 or more carbon atoms may be referred to as the second catalyst system. In one or more embodiments, the second catalyst system includes a metallocene compound represented by the formula:

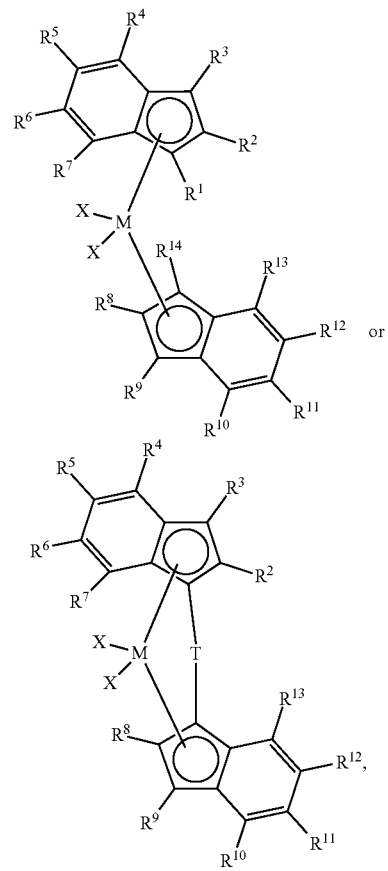

wherein, $R^2$ and $R^8$ are may be the same or different and each is, independently a $C_1$ to C20 linear alkyl group, provided at least one of $R^2$ and $R^8$ has at least 4 carbon atoms, preferably at least 6 carbon atoms, preferably $R^2$ and $R^8$ have no branches at the alpha or beta positions;

R4 and R10 are substituted or unsubstituted aryl groups (such as substituted or unsubstituted phenyl groups, preferably substituted phenyl groups), provided that at least one of the aryl groups is: 1) substituted at an othro position with at least one group selected from $C_1$ to $C_{40}$ hydrocarbyls, heteroatoms, and heteroatom containing groups; and/or 2) substituted at the 3', 4' or 5' position with at least one group selected from $C_1$ to $C_{40}$ hydrocarbyls, heteroatoms, and heteroatom containing groups;

M is a group 2, 3 or 4 transition metal, preferably group 4 transition metal;

T is a bridging group;

each X is an anionic leaving group; and each R1, R3, R5, R6, R7, R9, R11, R12, R13, and R14 is, independently, hydrogen, or a hydrocarbyl, substituted hydrocarbyl, halocarbyl, substituted halocarbyl, silylcarbyl, substituted silylcarbyl, germylcarbyl, or substituted germylcarbyl substituents.

In any embodiment described herein, R2 may be a linear C1-C10 alkyl group, such as methyl, ethyl, n-propyl, n-butyl, n-pentyl, n-hexyl, n-heptyl, n-octyl, n-nonyl or n-decyl) which may be halogenated, preferably with I, F, Cl or Br.

In any embodiment described herein, R8 is a linear C1-C10 alkyl group, preferably methyl, ethyl, n-propyl, n-butyl, n-pentyl, n-hexyl, n-heptyl, n-octyl, n-nonyl or n-decyl) which may be halogenated, preferably with I, F, Cl or Br.

In some embodiments of the invention, R2 and R8 are the same linear alkyl group, such as n-butyl, n-hexyl, etc.

In alternate embodiments, R2 and R8 are different, such as R2 is methyl and R8 is n-butyl, n-pentyl, n-hexyl, n-heptyl, or n-octyl.

By "substituted phenyl group" is meant a phenyl is substituted with 1, 2, 3, 4, or 5 $C_1$ to $C_{20}$ substituted or unsubstituted hydrocarbyl groups, such as methyl, ethyl, propyl, butyl, pentyl, hexyl, heptyl, octyl, nonyl, decyl, undecyl, dodecyl, phenyl, substituted phenyl, biphenyl or an isomer thereof. In useful embodiments, the phenyl group is substituted at the meta or para positions, preferably the 3' and/or 5' positions, preferably with C4 to C12 alkyl groups. Alternately the phenyl group may be substituted at the 2' position, but is preferably not substituted in the 2' and 6' positions, e.g., in a preferred embodiment of the invention when the 2' position of the phenyl is substituted, the 6' position is H). Alternately, the phenyl group may be substituted at the 4' position, with a group of the formula $(XR'_n)$—, wherein X is a Group 14, 15, 16, or 17 heteroatom and R' is one of a hydrogen atom, halogen atom, a $C_1$-$C_{10}$ alkyl group, or a $C_6$-$C_{10}$ aryl group and n is 0, 1, 2, or 3; preferably —$NR'_2$, —SR', —OR', —$OSiR'_3$, —$SiR'_3$, or —$PR'_2$; and optionally, one or more of the remaining positions on the phenyl are substituted, such as the 2', 3' and or 5' positions.

In another aspect the 4' position on the aryl group is not a C4 group, alternately is not a hydrocarbyl group.

In another aspect, R4 and $R^{10}$ are independently substituted phenyl groups, preferably phenyl groups substituted with C1 to a C10 alkyl groups (such as t-butyl, sec-butyl, n-butyl, isopropyl, n-propyl, cyclopropyl, cyclobutyl, cyclopentyl, cyclohexyl, cycloheptyl, cyclooctyl, phenyl, mesityl, or adamantyl), or an aryl group which may be further substituted with an aryl group, and the two aryl groups bound together can be joined together directly or by linker groups, wherein the linker group is an alkyl, vinyl, phenyl, alkynyl, silyl, germyl, amine, ammonium, phosphine, phosphonium, ether, thioether, borane, borate, alane or aluminate groups.

In another aspect, at least one of R4 and R10 is (or optionally, both are) a phenyl group substituted at the 3' and 5' position.

In another aspect, at least one of R4 and R10 is (or optionally, both are) a phenyl group substituted at the 2' position with an alkyl or an aryl group, such as a phenyl group.

In another aspect, at least one of R4 and R10 is (or optionally, both are) a phenyl group substituted at the 3' and 5' position and at least one of R4 and R10 is a phenyl group substituted at the 2' position with an alkyl group or an aryl group, such as a phenyl group.

In yet another aspect, at least one of R4 and R10 is (or optionally, both are) a phenyl group substituted at the 3' and 5' positions with C1 to a C10 alkyl groups, such as a tertiary butyl group.

In yet another aspect, at least one of R4 and R10 is a phenyl group substituted at the 3' and 5' positions with C1 to a C10 alkyl groups, such as a tertiary butyl group and at least one of R4 and R10 is a phenyl group substituted at the 2' position with an alkyl or an aryl group, such as a phenyl group.

In yet another aspect, at least one of R4 and R10 is a phenyl group substituted at the 3' and 5' positions with C1 to a C10 alkyl groups, such as a tertiary butyl group and at the 4' position with $(XR'_n)$—, wherein X is a Group 14, 15, 16 or 17 heteroatom having an atomic weight of 13 to 79, R' is one of a hydrogen atom, halogen atom, a $C_1$-$C_{10}$ alkyl group, or a $C_6$-$C_{10}$ aryl group, and n is 0, 1, 2, or 3, such as methoxy, and at least one of R4 and R10 is a phenyl group substituted at the 2' position with an alkyl or an aryl group, such as a phenyl group.

In yet another aspect, both R4 and R10 are a phenyl group substituted at the 3' and 5' positions with C1 to a C10 alkyl groups, such as a tertiary butyl group.

In still another aspect, at least one of R4 and R10 is a phenyl group substituted at the 3' and 5' positions with aryl groups, such as substituted or unsubstituted phenyl groups.

In still another aspect, both R4 and R10 are a phenyl group substituted at the 3' and 5' positions with aryl groups, such as substituted or unsubstituted phenyl groups.

In another aspect, at least one of R4 and R10 is an aryl group substituted at 3' and 5' positions with C1 to a C10 alkyl groups (such as t-butyl, sec-butyl, n-butyl, isopropyl, n-propyl, cyclopropyl, cyclobutyl, cyclopentyl, cyclohexyl, cycloheptyl, cyclooctyl, phenyl, mesityl, or adamantyl) or aryl groups and combinations thereof, wherein, when $R^4$ or $R^{10}$ is a phenyl group which is further substituted with an aryl group, the two groups bound together can be joined together directly or by linker groups, wherein the linker group is an alkyl, vinyl, phenyl, alkynyl, silyl, germyl, amine, ammonium, phosphine, phosphonium, ether, thioether, borane, borate, alane or aluminate groups.

Alternately, when at least one of R4 and R10 is a phenyl group substituted at 3' and 5' positions, the phenyl group may also be substituted at the 4' position, preferably with a substituent is selected from $(XR'_n)$—, wherein X is a Group 14, 15, 16 or 17 heteroatom having an atomic weight of 13 to 79 (preferably N, O, S, P, or Si) and R' is one of a hydrogen atom, halogen atom, a $C_1$-$C_{10}$ alkyl group (such as methyl, ethyl, propyl, butyl, pentyl, hexyl, octyl, nonyl, decyl or an isomer thereof), or a $C6$-$C_{10}$ aryl group and n is 0, 1, 2, or 3; preferably $(XR'_n)$— is —$NR'_2$, —SR', —OR', —$OSiR'_3$, —$SiR'_3$, or —PR'2, preferably $(XR'_n)$— is —$NR'_2$, —SR', —OR', —$OSiR'_3$, or —$PR'_2$, preferably $(XR'_n)$— is —SR', —OR', or —$OSiR'_3$, preferably $(XR'_n)$— is —$NR'_2$ or —$PR'_2$, or preferably $(XR'_n)$— is —OR' m preferably where R' is a $C_1$-$C_{10}$ alkyl group, particularly a methoxy, ethoxy, n-propoxy, isopropoxy, n-butoxy, iso-butoxy, sec-butoxy, or t-butoxy group, most particularly methoxy.

In yet another aspect, M is Hf, Ti and/or Zr, particularly Hf and/or Zr, particularly Zr.

Suitable radicals for the each of the groups R1, R3, R5, R6, R7, R9, R11, R12, R13, and R14 are independently selected from hydrogen or hydrocarbyl radicals including methyl, ethyl, ethenyl, and all isomers (including cyclics such as cyclohexyl) of propyl, butyl, pentyl, hexyl, heptyl, octyl, nonyl, decyl, undecyl, dodecyl, propenyl, butenyl, and from halocarbyls and all isomers of halocarbyls including perfluoropropyl, perfluorobutyl, perfluoroethyl, perfluoromethyl, and from substituted hydrocarbyl radicals and all isomers of substituted hydrocarbyl radicals including trimethylsilylpropyl, trimethylsilylmethyl, trimethylsilylethyl, and from phenyl, and all isomers of hydrocarbyl substituted phenyl including methylphenyl, dimethylphenyl, trimethylphenyl, tetramethylphenyl, pentamethylphenyl, diethylphenyl, triethylphenyl, propylphenyl, dipropylphenyl, tripropylphenyl, dimethylethylphenyl, dimethylpropylphenyl, dimethylbutylphenyl, dipropylmethylphenyl, and the like; from all isomers of halo substituted phenyl (where halo is, independently, fluoro, chloro, bromo and iodo) including halophenyl, dihalophenyl, trihalophenyl, tetrahalophenyl, and pentahalophenyl; and from all isomers of halo substituted hydrocarbyl substituted phenyl (where halo is, independently, fluoro, chloro, bromo and iodo) including halomethylphenyl, dihalomethylphenyl, (trifluoromethyl)phenyl, bis(triflouromethyl)phenyl; and from all isomers of benzyl, and all isomers of hydrocarbyl substituted benzyl including methylbenzyl, dimethylbenzyl.

In other embodiments of the invention, each X is, independently, selected from the group consisting of hydrocarbyl radicals having from 1 to 20 carbon atoms, hydrides, amides, alkoxides, sulfides, phosphides, halides, dienes, amines, phosphines, ethers, and a combination thereof, (two X's may form a part of a fused ring or a ring system).

Suitable examples for X include chloride, bromide, fluoride, iodide, hydride, and C1 to C20 hydrocarbyls, preferably methyl, ethyl, propyl, butyl, pentyl, hexyl, phenyl, benzyl, and all isomers thereof, or two X together are selected from C4 to C10 dienes, preferably butadiene, methylbutadiene, pentadiene, methylpentadiene, dimethylpentadiene, hexadiene, methylhexadiene, dimethylhexadiene, or from C1 to C10 alkylidenes, preferably methylidene, ethylidene, propylidene, or from C3 to C10 alkyldiyls, preferably propandiyl, butandiyl, pentandiyl, and hexandiyl. In particular, X is chloride or methyl.

In any embodiment, T is a bridging group selected from R'2C, R'2Si, R'2Ge, R'2CCR'2, R'2CCR'2CR'2, R'C=CR', R'C=CR'CR'2, R'2CSiR'2, R'2SiSiR'2, R'2CSiR'2CR'2, R'2SiCR'2SiR'2, R'C=CR'SiR'2, R'2CGeR'2, R'2GeGeR'2, R'2CGeR'2CR'2, R'2GeCR'2GeR'2, R'2SiGeR'2, R'C=CR'GeR'2, R'B, R'2C—BR', R'2C—BR'—CR'2, R'N, R'2C—NR', R'2C—NR'—CR'2, R'P, R'2C—PR', and R'2C—PR'—CR'2 where R' is, independently, hydrogen, hydrocarbyl, substituted hydrocarbyl, halocarbyl, substituted halocarbyl, silylcarbyl, or germylcarbyl, and two or more R' on the same atom or on adjacent atoms may join together to form a substituted or unsubstituted, saturated, partially unsaturated, or aromatic cyclic or polycyclic substituent.

Suitable examples for the bridging group T include dihydrocarbylsilylenes including dimethylsilylene, diethylsilylene, dipropylsilylene, dibutylsilylene, dipentylsilylene, dihexylsilylene, methylphenylsilylene, diphenylsilylene, dicyclohexylsilylene, methylcyclohexylsilylene, dibenzylsilylene, tetramethyldisilylene, cyclotrimethylenesilylene, cyclotetramethylenesilylene, cyclopentamethylenesilylene, divinylsilylene, and tetramethyldisiloxylene; dihydrocarbylgermylenes including dimethylgermylene, diethylgermylene, dipropylgermylene, dibutylgermylene, methylphenylgermylene, diphenylgermylene, dicyclohexylgermylene, methylcyclohexylgermylene, cyclotrimethylenegermylene, cyclotetramethylenegermylene, and cyclopentamethylenegermylene; carbylenes and carbdiyls including methylene, dimethylmethylene, diethylmethylene, dibutylmethylene, dipropylmethylene, diphenylmethylene, ditolylmethylene, di(butylphenyl)methylene, di(trimethylsilylphenyl)methylene, dibenzylmethylene, cyclotetramethylenemethylene, cyclopentamethylenemethylene, ethylene, methylethylene, dimethylethylene, trimethylethylene, tetramethylethylene, cyclopropylene, cyclobutylene, cyclopentylene, cyclohexylene, propanediyl, methylpropanediyl, dimethylpropanediyl, trimethylpropanediyl, tetramethylpropanediyl, pentamethylpropanediyl, hexamethylpropanediyl, vinylene, and ethene-1,1-diyl; boranediyls including methylboranediyl, ethylboranediyl, propylboranediyl, butylboranediyl, pentylboranediyl, hexylboranediyl, cyclohexylboranediyl, and phenylboranediyl; and combinations thereof including dimethylsilylmethylene, diphenylsilylmethylene, dimethylsilylethylene, methylphenylsilylmethylene.

In particular, T is CH2, CH2CH2, C(CH3)2, SiMe2, SiPh2, SiMePh, Si(CH2)3, Si(CH2)4, Si(Me$_3$SiPh)$_2$, or Si(CH2)$_5$.

In another embodiment, T is represented by the formula R2aJ, where J is C, Si, or Ge, and each Ra is, independently, hydrogen, halogen, C1 to C20 hydrocarbyl or a C1 to C20 substituted hydrocarbyl, and two Ra can form a cyclic structure including aromatic, partially saturated, or saturated cyclic or fused ring system.

In a preferred embodiment of the invention in any formula described herein, T is represented by the formula, (R*$_2$G)$_g$, where each G is C, Si, or Ge, g is 1 or 2, and each R* is, independently, hydrogen, halogen, C1 to C20 hydrocarbyl or a C1 to C20 substituted hydrocarbyl, and two or more R* can form a cyclic structure including aromatic, partially saturated, or saturated cyclic or fused ring system.

In aspects of the invention, the rac/meso ratio of the metallocene catalyst is 50:1 or greater, or 40:1 or greater, or 30:1 or greater, or 20:1 or greater, or 15:1 or greater, or 10:1 or greater, or 7:1 or greater, or 5:1 or greater.

In an embodiment of the invention, the metallocene catalyst comprises greater than 55 mol % of the racemic isomer, or greater than 60 mol % of the racemic isomer, or greater than 65 mol % of the racemic isomer, or greater than 70 mol % of the racemic isomer, or greater than 75 mol % of the racemic isomer, or greater than 80 mol % of the racemic isomer, or greater than 85 mol % of the racemic isomer, or greater than 90 mol % of the racemic isomer, or greater than 92 mol % of the racemic isomer, or greater than 95 mol % of the racemic isomer, or greater than 98 mol % of the racemic isomer, based on the total amount of the racemic and meso isomer-if any, formed. In a particular embodiment of the invention, the metallocene, especially the bridged bis(indenyl)metallocene, compound consists essentially of the racemic isomer.

Amounts of rac and meso isomers are determined by proton NMR. $^1$H NMR data are collected at 23° C. in a 5 mm probe using a 400 MHz Bruker spectrometer with deuterated methylene chloride or deuterated benzene. Data is recorded using a maximum pulse width of 45°, 8 seconds between pulses and signal averaging 16 transients. The spectrum is normalized to protonated methylene chloride in the deuterated methylene chloride, which is expected to show a peak at 5.32 ppm.

In one or more embodiments, a second, different metallocene compound is used in the second catalyst system. For purposes of this specification, one metallocene catalyst compound is considered different from another if they differ by at least one atom. For example, "bisindenyl zirconium dichloride" is different from (indenyl)(2-methylindenyl) zirconium dichloride" which is different from "(indenyl)(2-methylindenyl) hafnium dichloride." Catalyst compounds that differ only by isomer are considered the same for purposes if this invention, e.g., rac-dimethylsilylbis(2-methyl 4-phenyl)hafnium dimethyl is considered to be the same as meso-dimethylsilylbis(2-methyl 4-phenyl)hafnium dimethyl.

Catalyst Loading

The polymerization of olefin in the production of the blends of this invention can be accomplished in the presence of a catalytically effective amount of the above-described catalyst systems. The amount of each of the respective catalyst systems used depends on the interplay of various factors, such as the purity of the ingredients, the activator employed, the polymerization conditions, such as temperature and pressure, the polymerization rate and conversion desired, the molecular weight desired, and many other factors. Accordingly, the amount of each of the respective catalyst systems cannot be definitively set forth except to say that catalytically effective amounts of the respective catalyst ingredients should be used. And, those skilled in the art have knowledge of this disclosure, the appropriate amount of each of the respective catalyst systems can be readily determined without undue calculation or experimentation. Likewise, the ratio of the two catalyst systems relative to each other can vary. In an embodiment, a molar ratio of the first catalyst system (A) to the second catalyst system (B) may fall within the range of (A:B) 1:1000 to 1000:1, or 1:100 to 500:1, or 1:10 to 200:1, or 1:1 to 100:1, or 1:1 to 75:1, or 5:1 to 50:1. The particular ratio chosen will depend on the exact catalyst systems chosen, the method of activation, and the end product desired. As suggested above, both catalyst systems may advantageously be activated by the same activator, and the amount of activator used, relative to the catalyst compounds (e.g. the metal-salan compound or the metallocene compound) may be represented as a molar ratio of activator to catalyst compound, which may be within the range 10:90 to 0.1:99, or 25:75 to 99:1, or 50:50 to 99.5:0.5, or 50:50 to 99:1, or 75:25 to 99:1, or 90:10 to 99:1.

Activators

The terms "cocatalyst" and "activator" are used herein interchangeably and are defined to be any compound that can activate any one of the catalyst compounds (i.e. the salan compound or metallocene compound) described above by converting the neutral catalyst compound to a catalytically active catalyst compound cation. Non-limiting activators, for example, include alumoxanes, aluminum alkyls, ionizing activators, which may be neutral or ionic, and conventional-type cocatalysts. Particular activators typically include alumoxane compounds, modified alumoxane compounds, and ionizing anion precursor compounds that abstract a reactive, σ-bound, metal ligand making the metal complex cationic and providing a charge-balancing noncoordinating or weakly coordinating anion.

In one embodiment, alumoxane activators are utilized as an activator in the catalyst composition. Alumoxanes are generally oligomeric compounds containing —Al(R1)-O— sub-units, where R1 is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide or amide. Mixtures of different alumoxanes and modified alumoxanes may also be used. It may be preferable to use a visually clear methylalumoxane. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylalumoxane type 3A, covered under patent number U.S. Pat. No. 5,041,584).

When the activator is an alumoxane (modified or unmodified), some embodiments select the maximum amount of activator at a 5000-fold molar excess Al/M over the catalyst compound (per metal catalytic site). The minimum activator-to-catalyst-compound is a 1:1 molar ratio. Alternate ranges include from 1:1 to 1000:1, alternately from 1:1 to 500:1 alternately from 1:1 to 200:1, alternately from 1:1 to 100:1, or alternately from 1:1 to 50:1.

In an alternate embodiment, little or no alumoxane is used in the polymerization processes described herein. In particular embodiments, alumoxane is present at zero mol %, alternately the alumoxane is present at a molar ratio of aluminum to catalyst compound transition metal less than 500:1, in other embodiments less than 300:1, in other embodiments less than 100:1, in other embodiments less than 1:1.

The term "non-coordinating anion" (NCA) means an anion which either does not coordinate to a cation or which is only weakly coordinated to a cation thereby remaining sufficiently labile to be displaced by a neutral Lewis base. "Compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion. Non-coordinating anions useful in accordance with this invention are those that are compatible, stabilize the transition metal cation in the sense of balancing its ionic charge at +1, and yet retain sufficient lability to permit displacement during polymerization.

It is within the scope of this invention to use an ionizing or stoichiometric activator, neutral or ionic, such as tri (n-butyl) ammonium tetrakis (pentafluorophenyl) borate, a tris perfluorophenyl boron metalloid precursor or a tris perfluoronaphthyl boron metalloid precursor, polyhalogenated heteroborane anions (WO 98/43983), boric acid (U.S. Pat. No. 5,942,459), or combination thereof. It is also within the scope of this invention to use neutral or ionic activators alone or in combination with alumoxane or modified alumoxane activators.

Examples of neutral stoichiometric activators include tri-substituted boron, tellurium, aluminum, gallium, and indium, or mixtures thereof. The three substituent groups are each independently selected from alkyls, alkenyls, halogens, substituted alkyls, aryls, arylhalides, alkoxy, and halides. Preferably, the three groups are independently selected from halogen, mono or multicyclic (including halosubstituted) aryls, alkyls, and alkenyl compounds, and mixtures thereof, preferred are alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). More preferably, the three groups are alkyls having 1 to 4 carbon groups, phenyl, naphthyl, or mixtures thereof. Even more preferably, the three groups are halogenated, preferably fluorinated, aryl groups. A preferred neutral stoichiometric activator is tris perfluorophenyl boron or tris perfluoronaphthyl boron.

Ionic stoichiometric activator compounds may contain an active proton, or some other cation associated with, but not coordinated to, or only loosely coordinated to, the remaining ion of the ionizing compound. Such compounds and the like are described in European publications EP 0 570 982 A; EP 0 520 732 A; EP 0 495 375 A; EP 0 500 944 B 1; EP 0 277 003 A; EP 0 277 004 A; U.S. Pat. Nos. 5,153,157; 5,198,401; 5,066,741; 5,206,197; 5,241,025; 5,384,299; 5,502,124; and U.S. Ser. No. 08/285,380, filed Aug. 3, 1994, all of which are herein fully incorporated by reference.

In one or more embodiments, compounds useful as an activator in the process of this invention comprise a cation, which can be a Bronsted acid capable of donating a proton, and a compatible non-coordinating anion which anion is relatively large (bulky), capable of stabilizing the active catalyst species (the Group 4 cation) which is formed when the two compounds are combined and said anion will be sufficiently labile to be displaced by olefinic, diolefinic and acetylenically unsaturated substrates or other neutral Lewis bases, such as ethers, amines, and the like. Two classes of useful compatible non-coordinating anions have been disclosed in EP 0 277,003 A1, and EP 0 277,004 A1: 1) anionic coordination complexes comprising a plurality of lipophilic radicals covalently coordinated to and shielding a central charge-bearing metal or metalloid core; and 2) anions comprising a plurality of boron atoms such as carboranes, metallacarboranes, and boranes.

In particular embodiments, the stoichiometric activators include a cation and an anion component, and are preferably represented by the following formula (II):

$$(Z)d+(Ad-) \tag{II}$$

wherein Z is (L–H) or a reducible Lewis Acid, L is an neutral Lewis base; H is hydrogen; (L–H)+ is a Bronsted acid; Ad– is a non-coordinating anion having the charge d–; and d is an integer from 1 to 3.

When Z is (L–H) such that the cation component is (L–H)d+, the cation component may include Bronsted acids such as protonated Lewis bases capable of protonating a moiety, such as an alkyl or aryl, from the bulky ligand metallocene containing transition metal catalyst precursor, resulting in a cationic transition metal species. In particular embodiments, the activating cation (L–H)d+ is a Bronsted acid, capable of donating a proton to the transition metal catalytic precursor resulting in a transition metal cation, including ammoniums, oxoniums, phosphoniums, silyliums, and mixtures thereof, preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxoniums from ethers, such as dimethyl ether diethyl ether, tetrahydrofuran, and dioxane, sulfoniums from thioethers, such as diethyl thioethers and tetrahydrothiophene, and mixtures thereof.

When Z is a reducible Lewis acid, it may be represented by the formula: (Ar3C+), where Ar is aryl or aryl substituted with a heteroatom, a C1 to C40 hydrocarbyl, or a substituted C1 to C40 hydrocarbyl, the reducible Lewis acid may be represented by the formula: (Ph3C+), where Ph is phenyl or phenyl substituted with a heteroatom, a C1 to C40 hydrocarbyl, or a substituted C1 to C40 hydrocarbyl. In a particular embodiment, the reducible Lewis acid is triphenyl carbenium.

The anion component Ad– include those having the formula [Mk+Qn]d– wherein k is 1, 2, or 3; n is 1, 2, 3, 4, 5, or 6, preferably 3, 4, 5 or 6; n–k=d; M is an element selected from Group 13 of the Periodic Table of the Elements, such as boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than one occurrence is Q a halide, and two Q groups may form a ring structure. In an embodiment, each Q is a fluorinated hydrocarbyl group having 1 to 20 carbon atoms, in particular embodiments each Q is a fluorinated aryl group, and in certain embodiments each Q is a pentafluoryl aryl group. Examples of suitable Ad– components also include diboron compounds as disclosed in U.S. Pat. No. 5,447,895, which is fully incorporated herein by reference.

In a preferred embodiment, this invention relates to a method to polymerize olefins comprising contacting olefins (preferably ethylene) with a catalyst compound and a boron containing NCA activator represented by the formula (14):

$$Zd+(Ad-) \tag{14}$$

where: Z is (L–H) or a reducible Lewis acid; L is an neutral Lewis base (as further described above); H is hydrogen; (L–H) is a Bronsted acid (as further described above); Ad– is a boron containing non-coordinating anion having the charge d– (as further described above); d is 1, 2, or 3.

In a particular embodiment in any NCA represented by Formula 14 described above, the reducible Lewis acid is represented by the formula: (Ar3C+), where Ar is aryl or aryl substituted with a heteroatom, a C1 to C40 hydrocarbyl, or a substituted C1 to C40 hydrocarbyl, in particular embodiments the reducible Lewis acid is represented by the formula: (Ph3C+), where Ph is phenyl or phenyl substituted with a heteroatom, a C1 to C40 hydrocarbyl, or a substituted C1 to C40 hydrocarbyl.

In a particular embodiment in any of the NCAs represented by Formula 14 described above, Zd+ is represented by the formula: (L–H)d+, wherein L is an neutral Lewis base; H is hydrogen; (L–H) is a Bronsted acid; and d is 1, 2, or 3, in particular embodiments (L–H)d+ is a Bronsted acid selected from ammoniums, oxoniums, phosphoniums, silyliums, and mixtures thereof.

In a particular embodiment in any of the NCAs represented by Formula 14 described above, the anion component Ad– is represented by the formula [M*k*+Q*n*]d*– wherein k* is 1, 2, or 3; n* is 1, 2, 3, 4, 5, or 6 (preferably 1, 2, 3, or 4); n*–k*=d*; M* is boron; and Q* is independently selected from hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q* having up to 20 carbon atoms with the proviso that in not more than 1 occurrence is Q* a halide.

This invention also relates to a method to polymerize olefins comprising contacting olefins (such as ethylene) with a catalyst compound and an NCA activator represented by the formula (I):

$$RnM**(ArNHal)4-n \tag{I}$$

where R is a monoanionic ligand; M** is a Group 13 metal or metalloid; ArNHal is a halogenated, nitrogen-containing aromatic ring, polycyclic aromatic ring, or aromatic ring assembly in which two or more rings (or fused ring systems) are joined directly to one another or together, and n is 0, 1, 2, or 3. Typically the NCA comprising an anion of Formula I also comprises a suitable cation that is essentially non-interfering with the ionic catalyst complexes formed with the transition metal compounds, preferably the cation is Zd+ as described above.

In a particular embodiment in any of the NCAs comprising an anion represented by Formula I described above, R is selected from the group consisting of substituted or unsubstituted C1 to C30 hydrocarbyl aliphatic or aromatic groups, where substituted means that at least one hydrogen on a carbon atom is replaced with a hydrocarbyl, halide, halocarbyl, hydrocarbyl or halocarbyl substituted organometalloid, dialkylamido, alkoxy, aryloxy, alkysulfido, arylsulfido, alkylphosphido, arylphosphide, or other anionic substituent; fluoride; bulky alkoxides, where bulky means C4 to C20 hydrocarbyl groups; —SRI, —NR22, and —PR32, where each R1, R2, or R3 is independently a substituted or unsubstituted hydrocarbyl as defined above; or a C1 to C30 hydrocarbyl substituted organometalloid.

In a particular embodiment in any of the NCAs comprising an anion represented by Formula I described above, the NCA also comprises cation comprising a reducible Lewis acid represented by the formula: (Ar3C+), where Ar is aryl or aryl substituted with a heteroatom, a C1 to C40 hydrocarbyl, or a substituted C1 to C40 hydrocarbyl, in particular embodiments the reducible Lewis acid represented by the formula: (Ph3C+), where Ph is phenyl or phenyl substituted with a heteroatom, a C1 to C40 hydrocarbyl, or a substituted C1 to C40 hydrocarbyl.

In a preferred embodiment in any of the NCAs comprising an anion represented by Formula I described above, the NCA also comprises a cation represented by the formula, (L–H)d+, wherein L is an neutral Lewis base; H is hydrogen; (L–H) is a Bronsted acid; and d is 1, 2, or 3; in a particular embodiment (L–H)d+ is a Bronsted acid selected from ammoniums, oxoniums, phosphoniums, silyliums, and mixtures thereof.

Further examples of useful activators include those disclosed in U.S. Pat. Nos. 7,297,653 and 7,799,879.

Another activator useful herein comprises a salt of a cationic oxidizing agent and a non-coordinating, compatible anion represented by the formula (16):

(OXe+)d(Ad–)e     (16), wherein OXe+ is a cationic oxidizing agent having a charge of e+; e is 1, 2, or 3; d is 1, 2 or 3; and Ad– is a non-coordinating anion having the charge of d–(as further described above). Examples of cationic oxidizing agents include: ferrocenium, hydrocarbyl-substituted ferrocenium, Ag+, or Pb+2. Particular embodiments of Ad– include tetrakis(pentafluorophenyl)borate.

In another embodiment, the catalyst compounds described herein can be used with Bulky activators. A "Bulky activator" as used herein refers to anionic activators represented by the formula:

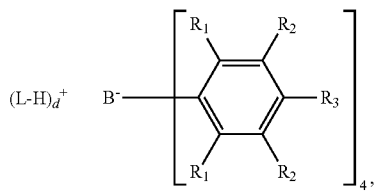

where:
each R1 is, independently, a halide, preferably a fluoride;
each R2 is, independently, a halide, a C6 to C20 substituted aromatic hydrocarbyl group or a siloxy group of the formula —O—Si—Ra, where Ra is a C1 to C20 hydrocarbyl or hydrocarbylsilyl group (preferably R2 is a fluoride or a perfluorinated phenyl group); each R3 is a halide, C6 to C20 substituted aromatic hydrocarbyl group or a siloxy group of the formula —O—Si—Ra, where Ra is a C1 to C20 hydrocarbyl or hydrocarbylsilyl group (preferably R3 is a fluoride or a C6 perfluorinated aromatic hydrocarbyl group); wherein R2 and R3 can form one or more saturated or unsaturated, substituted or unsubstituted rings (preferably R2 and R3 form a perfluorinated phenyl ring);
L is an neutral Lewis base; (L–H)+ is a Bronsted acid; d is 1, 2, or 3;
wherein the anion has a molecular weight of greater than 1020 g/mol; and
wherein at least three of the substituents on the B atom each have a molecular volume of greater than 250 cubic Å, alternately greater than 300 cubic Å, or alternately greater than 500 cubic Å.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

Molecular volume may be calculated as reported in "A Simple "Back of the Envelope" Method for Estimating the Densities and Molecular Volumes of Liquids and Solids," Journal of Chemical Education, Vol. 71, No. 11, November 1994, pp. 962-964. Molecular volume (MV), in units of cubic Å, is calculated using the formula: MV=8.3Vs, where Vs is the scaled volume. Vs is the sum of the relative volumes of the constituent atoms, and is calculated from the molecular formula of the substituent using the following table of relative volumes. For fused rings, the Vs is decreased by 7.5% per fused ring.

| Element | Relative Volume |
| --- | --- |
| H | 1 |
| $1^{st}$ short period, Li to F | 2 |
| $2^{nd}$ short period, Na to Cl | 4 |
| $1^{st}$ long period, K to Br | 5 |
| $2^{nd}$ long period, Rb to I | 7.5 |
| $3^{rd}$ long period, Cs to Bi | 9 |

Exemplary bulky substituents of activators suitable herein and their respective scaled volumes and molecular volumes are shown in the table at column 20, line 35 et seq. of U.S. Pat. No. 9,266,977.

For a list of particularly useful Bulky activators please see U.S. Pat. No. 8,658,556, which is incorporated by reference herein.

In another embodiment, one or more of the NCA activators is chosen from the activators described in U.S. Pat. No. 6,211,105.

Useful activators include N,N-dimethylanilinium tetrakis(perfluoronaphthyl)borate, N,N-dimethylanilinium tetrakis(perfluorobiphenyl)borate, N,N-dimethylanilinium tetrakis(perfluorophenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, [Ph3C+][B(C6F5)4–], [Me3NH+][B(C6F5)4–]; 1-(4-(tris(pentafluorophenyl)borate)-2,3,5,6-tetrafluorophenyl)pyrrolidinium; and tetrakis(pentafluorophenyl)borate, 4-(tris(pentafluorophenyl)borate)-2,3,5,6-tetrafluoropyridine.

In a particular embodiment, the activator comprises a triaryl carbonium (such as triphenylcarbenium tetraphenylborate, triphenylcarbenium tetrakis(pentafluorophenyl)borate, triphenylcarbenium tetrakis-(2,3,4,6-tetrafluorophenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate).

In another embodiment, the activator comprises one or more of trialkylammonium tetrakis(pentafluorophenyl)borate, N,N-dialkylanilinium tetrakis(pentafluorophenyl)borate, N,N-dimethyl-(2,4,6-trimethylanilinium) tetrakis(pentafluorophenyl)borate, trialkylammonium tetrakis-(2,3,4,6-tetrafluorophenyl) borate, N,N-dialkylanilinium tetrakis-(2,3,4,6-tetrafluorophenyl)borate, trialkylammonium tetrakis (perfluoronaphthyl)borate, N,N-dialkylanilinium tetrakis (perfluoronaphthyl)borate, trialkylammonium tetrakis (perfluorobiphenyl)borate, N,N-dialkylanilinium tetrakis (perfluorobiphenyl)borate, trialkylammonium tetrakis(3,5-bis(trifluoromethyl)phenyl)borate, N,N-dialkylanilinium tetrakis(3,5-bis(trifluoromethyl)phenyl)borate, N,N-dialkyl-(2,4,6-trimethylanilinium) tetrakis(3,5-bis(trifluoromethyl)phenyl)borate, di-(i-propyl)ammonium tetrakis(pentafluorophenyl)borate, (where alkyl is methyl, ethyl, propyl, n-butyl, sec-butyl, or t-butyl).

In a particular embodiment, any of the activators described herein may be mixed together before or after combination with the catalyst compound, in particular embodiments before being mixed with the catalyst compound.

In some embodiments two NCA activators may be used in the polymerization and the molar ratio of the first NCA activator to the second NCA activator can be any ratio. In some embodiments, the molar ratio of the first NCA activator to the second NCA activator is 0.01:1 to 10,000:1, preferably 0.1:1 to 1000:1, preferably 1:1 to 100:1.

Further, the typical activator-to-catalyst ratio, e.g., all NCA activators-to-catalyst ratio is a 1:1 molar ratio. Alternate ranges include from 0.1:1 to 100:1, alternately from 0.5:1 to 200:1, alternately from 1:1 to 500:1 alternately from 1:1 to 1000:1. A particularly useful range is from 0.5:1 to 10:1, preferably 1:1 to 5:1.

It is also within the scope of this invention that the catalyst compounds can be combined with combinations of alumoxanes and NCAs (see, for example, U.S. Pat. Nos. 5,153,157, 5,453,410, EP 0 573 120 BI, WO 94/07928, and WO 95/14044 which discuss the use of an alumoxane in combination with an ionizing activator).

Optional Scavengers or Co-Activators

In addition to these activator compounds, scavengers or co-activators may be used. Aluminum alkyl or organoaluminum compounds which may be utilized as scavengers or co-activators include, for example, trimethylaluminum, triethylaluminum, triisobutylaluminum, tri-n-hexylaluminum, tri-n-octylaluminum, and diethyl zinc.

Chain Transfer Agents

In one or more embodiments, one or both of the catalyst systems may be used in conjunction with a chain transfer agent. A "chain transfer agent" is any agent capable of hydrocarbyl and/or polymeryl group exchange between a coordinative polymerization catalyst and the metal center of the chain transfer agent during a polymerization process. The chain transfer agent can be any desirable chemical compound such as those disclosed in WO 2007/130306. In one or more embodiments, the chain transfer agent is selected from Group 2, 12 or 13 alkyl or aryl compounds; in particular embodiments zinc, magnesium or aluminum alkyls or aryls; in particular embodiments where the alkyl is a C1 to C30 alkyl, alternately a C2 to C20 alkyl, alternately a C3 to 12 alkyl, typically selected independently from methyl, ethyl, propyl, butyl, isobutyl, tertbutyl, pentyl, hexyl, cyclohexyl, phenyl, octyl, nonyl, decyl, undecyl, and dodecyl; and where di-ethylzinc is used in particular embodiments.

In a particularly useful embodiment, the chain transfer agent is selected from Group 2, 12 or 13 alkyl or aryl compounds. In a particularly useful embodiment, the chain transfer agent is selected from dialkyl zinc compounds, where the alkyl is selected independently from methyl, ethyl, propyl, butyl, isobutyl, tertbutyl, pentyl, hexyl, cyclohexyl, and phenyl.

In a particularly useful embodiment, the chain transfer agent is selected from trialkyl aluminum compounds, where the alkyl is selected independently from methyl, ethyl, propyl, butyl, isobutyl, tertbutyl, pentyl, hexyl, cyclohexyl, and phenyl.

Useful chain transfer agents are typically present at from 10 or 20 or 50 or 100 equivalents to 600 or 700 or 800 or 1000 equivalents relative to the catalyst component. Alternately the chain transfer agent ("CTA") is preset at a catalyst complex-to-CTA molar ratio of from about 1:3000 to 10:1; alternatively 1:2000 to 10:1; alternatively 1:1000 to 10:1; alternatively, 1:500 to 1:1; alternatively 1:300 to 1:1; alternatively 1:200 to 1:1; alternatively 1:100 to 1:1; alternatively 1:50 to 1:1; alternatively 1:10 to 1:1.

Useful chain transfer agents include diethylzinc, tri-n-octyl aluminum, trimethylaluminum, triethylaluminum, triisobutylaluminum, tri-n-hexylaluminum, diethyl aluminum chloride, dibutyl zinc, di-n-propylzinc, di-n-hexylzinc, di-n-pentylzinc, di-n-decylzinc, di-n-dodecylzinc, di-n-tetradecylzinc, di-n-hexadecylzinc, di-n-octadecylzinc, diphenylzinc, diisobutylaluminum hydride, diethylaluminum hydride, di-n-octylaluminum hydride, dibutylmagnesium, diethylmagnesium, dihexylmagnesium, and triethylboron.

Process for Producing Blend

As indicated above, the comb polyolefin is synthesized in the presence of the VTP; i.e., the comb polyolefin is prepared in situ within a reaction mixture that includes the VTP. The polymerization (i.e., synthesis) of the VTP and the comb polyolefin may take place in a conventional manner whereby the first and second catalyst systems are brought into contact with the monomer to be polymerized. The combination of a catalyst system with monomer to be polymerized, and optionally the products of the polymerization of monomer, may be referred to as a polymerization mixture.

The first catalyst system and the second catalyst system may be combined with the monomer to be polymerized in any order. For example, the catalyst systems may be charged to the monomer to be polymerized in a sequential manner, e.g., the first catalyst system may be combined with the monomer followed be the second catalyst system. Alternatively, the first catalyst system and the second catalyst system may be combined prior to contacting with the monomer. Likewise, the activator of the first and/or second catalyst system (which may optionally be the same) may also be combined in any order. For example, the activator may be combined with the monomer to be polymerized prior to the introduction of the catalyst compounds, or the activator may be combined with the catalyst compounds prior to contacting the mixture with the monomer. In an embodiment, the activator is introduced after contacting the catalyst compounds with the monomer.

In or more embodiments, a first polymerization mixture is prepared by combining the first catalyst system with the monomer to be polymerized, which includes a mixture of ethylene and propylene. After formation of this first polymerization mixture, and the synthesis of at least a portion of the VTP, the metallocene compound, optionally together with an activator and additional monomer (e.g. propylene monomer), is introduced to the first polymerization mixture to form a second polymerization mixture in which the comb polyolefin in synthesized.

In one or more embodiments, the polymerization process includes using two or more continuous solution reactors in series where the first reactor is used to synthesize VTPs and the second reactor is used to synthesize comb polyolefin using the first reactor polymerization mixture, including monomers, VTPs, and first reactor catalyst/activator, plus monomer and second catalyst/activator feeds to the second reactor.

The skilled artisan, once having the benefit of this disclosure, will readily perceive how to control polymerization reaction conditions so as to obtain a desired molecular weight of the VTP, and of the comb polyolefin (e.g., by operating the polymerization process to increase or decrease the activity of the first and second catalysts, respectively). Moreover, the relative amount of the VTP relative to the comb polyolefin (i.e., the proportion of the first and second fraction in the copolymer composition) may be controlled by controlling the relative activity of the first and second catalysts. In particular embodiments, this includes controlling the molar ratio of the first catalyst to the second catalyst.

Methods for controlling the relative amount of the VTP relative to the comb polyolefin are known and include controlling polymerization reaction temperature and the feed rate of chain transfer agents (e.g., hydrogen) to the polymerization reaction zone, as well as controlling the monomer (e.g., ethylene and/or propylene) concentration in the reaction zone. For instance, molecular weight (i.e., polymer chain length) control can be achieved through control of the reactor temperature (e.g., by adjusting the feed temperature of the monomers and solvent). Lowering the reactor temperature will generally lead to higher molecular weight (longer polymer chain length) while higher operating temperature may increase the catalyst activity and/or permit higher polymer concentrations in the reactor and achieve higher productivity (although higher catalyst activity typically means lower molecular weight or shorter polymer chains). However, the temperature should not exceed the polymerization decomposition temperature or the temperature at which the catalyst(s) can sustain the polymerization reactions.

Monomer concentration in the polymerization reaction zone can be controlled by one or more of monomer feed rate, catalyst feed rate, and residence time (particularly in continuous reaction processes). Higher molecular weight in each fraction can be achieved under higher monomer concentration. On the other hand, increasing catalyst feed rate may result in increased conversion but lower monomer concentration in the polymerization reaction zone, and therefore lower molecular weight.

Chain transfer agents such as hydrogen can be utilized to supplement control of molecular weight (e.g., hydrogen flow to the reaction zone is increased to lower the molecular weight).

Generally, the polymerization processes according to the instant disclosure may be carried out in any manner known in the art. Any suspension, homogeneous, bulk, solution, slurry, or gas phase polymerization process known in the art can be used. These processes can be run in a batch, semi-batch, or continuous mode. Homogeneous polymerization processes and slurry processes are suitable for use herein, wherein a homogeneous polymerization process is defined to be a process where at least 90 wt % of the product is soluble in the reaction media. A bulk homogeneous process is suitable for use herein, wherein a bulk process is defined to be a process where monomer concentration in all feeds to the reactor is 70 vol % or more. In an embodiment, no solvent or diluent is present or added in the reaction medium, (except for the small amounts used as the carrier for the catalyst system or other additives, or amounts typically found with the monomer, e.g., propane in propylene). In an embodiment, the process is a slurry process. As used herein the term "slurry polymerization process" means a polymerization process where a supported catalyst is employed and monomers are polymerized on the supported catalyst particles. At least 95 wt % of polymer products derived from the supported catalyst are in granular form as solid particles (not dissolved in the diluent).

Suitable diluents/solvents for polymerization include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorinated C4-10 alkanes, chlorobenzene, and aromatic and alkyl substituted aromatic compounds, such as benzene, toluene, mesitylene, and xylene. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In an embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In an embodiment, the solvent is not aromatic, or aromatics are present in the solvent at less than 1 wt %, or less than 0.5 wt %, or less than 0.0 wt % based upon the weight of the solvents.

In an embodiment, the feed concentration of the monomers and comonomers for the polymerization is 60 vol % solvent or less, or 40 vol % or less, or 20 vol % or less, based on the total volume of the feedstream. Or the polymerization is run in a bulk process.

Polymerizations can be run at any temperature and/or pressure suitable to obtain the desired ethylene polymers. Suitable temperatures and/or pressures include a temperature in the range of from about 0° C. to about 300° C., or about 20° C. to about 200° C., or about 35° C. to about 150° C., or about 50° C. to about 150° C.; and at a pressure in the range of from about 0.35 MPa to about 10 MPa, or from about 0.45 MPa to about 6 MPa, or from about 0.5 MPa to about 4 MPa.

In an embodiment, the run time of the reaction is from about 0.1 minutes to about 24 hours, or up to 16 hours, or in the range of from about 5 to 250 minutes, or from about 10 to 120 minutes.

In some embodiments hydrogen is present in the polymerization reactor at a partial pressure of 0.001 to 50 psig (0.007 to 345 kPa), in other embodiments from 0.01 to 25 psig (0.07 to 172 kPa), or in other embodiments 0.1 to 10 psig (0.7 to 70 kPa). In some embodiments hydrogen is not added the polymerization reactor, i.e., hydrogen may be present from other sources, such as a hydrogen generating catalyst, but none is added to the reactor.

In an embodiment, the activity of the catalyst is at least 50 g/mmol/hour, or 500 or more g/mmol/hour, or 5000 or more g/mmol/hr, or 50,000 or more g/mmol/hr. In an alternate embodiment, the conversion of olefin monomer is at least 10%, based upon polymer yield and the weight of the monomer entering the reaction zone, or 20% or more, or 30% or more, or 50% or more, or 80% or more.

In an embodiment, the polymerization conditions include one or more of the following: 1) temperatures of 0 to 300° C. (or 25 to 150° C.); 2) a pressure of atmospheric pressure to 10 MPa (or 0.35 to 10 MPa, or from 0.45 to 6 MPa, or from 0.5 to 4 MPa); 3) the presence of an aliphatic hydrocarbon solvent (such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof; or where aromatics are or present in the solvent at less than 1 wt %, or less than 0.5 wt %, or at 0 wt % based upon the weight of the solvents); 4) wherein the catalyst system used in the polymerization comprises less than 0.5 mol %, or 0 mol % alumoxane, or the alumoxane is present at a molar ratio of aluminum to transition metal less than 500:1, or less than 300:1, or less than 100:1, or less than 1:1; 5) the polymerization or occurs in one reaction zone; 6) the productivity of the catalyst compound is at least 80,000 g/mmol/hr (or at least 150,000 g/mmol/hr, or at least 200,000 g/mmol/hr, or at least 250,000 g/mmol/hr, or at least 300,000 g/mmol/hr); 7) scavengers (such as trialkyl aluminum compounds) are absent (e.g., present at zero mol %) or the scavenger is present at a molar ratio of scavenger to transition metal of less than 100:1, or less than 50:1, or less than 15:1, or less than 10:1; and/or 8) optionally hydrogen is present in the polymerization reactor at a partial pressure of 0.007 to 345 kPa (0.001 to 50 psig) (or from 0.07 to 172 kPa (0.01 to 25 psig), or 0.7 to 70 kPa (0.1 to 10 psig)).

A "reaction zone" also referred to as a "polymerization zone" is a vessel where polymerization takes place, for example a batch reactor. When multiple reactors are used in either series or parallel configuration, each reactor is considered as a separate polymerization zone. For a multi-stage polymerization in both a batch reactor and a continuous reactor, each polymerization stage is considered as a separate polymerization zone. In an embodiment, the polymerization occurs in one reaction zone.

Adhesive Composition

As indicated above, the polymeric blends of this invention may be used as adhesive compositions. These adhesive compositions may also contain other additives that are conventional in the art of making adhesive compositions. These conventional additives include, but are not limited to, anti-block agents, anti-static agents, antioxidants, UV stabilizers, neutralizers, lubricants, surfactants, anti-nucleating agents and/or fillers. In particular embodiments, the additives may include one or more of silica, titanium dioxide, polydimethylsiloxane, talc, dyes, wax, calcium stearate, calcium carbonate, carbon black, barium sulphate and magnesium silicate.

Advantageously, the adhesive compositions of the present invention demonstrate useful properties in the absence or substantial absence of additional tackifiers and/or waxes. In particular embodiments, the adhesive compositions of this invention are devoid of added tackifiers. In these or other embodiments, the adhesive compositions of this invention are devoid of added waxes.

In one or more embodiments, the adhesive compositions of the present invention include less than 10, in other embodiments less than 5, and in other embodiments less than 2.5 wt %, based upon the entire weight of the composition, of added tackifiers. In these or other embodiments, the adhesive compositions of the present invention include less than 10, in other embodiments less than 5, and in other embodiments less than 2.5 wt %, based upon the entire weight of the composition, of added waxes.

Industrial Applicability

In one or more embodiments, the adhesive compositions of the invention may be used as pressure sensitive adhesives, hot melt adhesives or contact adhesives and used in applications such as tapes, labels, paper impregnation, hot-melt adhesives, including woodworking, packaging, bookbinding or disposables, sealants, rubber compounds, pipe wrapping, carpet backing, contact adhesives, road-marking or tire construction. In particular embodiments, the adhesive compositions of the invention are useful as hot-melt pressure sensitive adhesives used for labels. Other uses are disclosed in U.S. Pat. No. 7,906,583, which is incorporated herein by reference.

In order to demonstrate the practice of the present invention, the following examples have been prepared and tested. The examples should not, however, be viewed as limiting the scope of the invention. The claims will serve to define the invention.

EXAMPLES

Polymerization reactions were carried out in a well-stirred 2-liter batch reactor equipped to perform coordinative insertion polymerization in the presence of an inert hydrocarbon (isohexane) solvent at temperatures up to 150° C. In the vapor-liquid polymerization system, the polymerization occurred in the liquid phase where gas ethylene was pressurized into the solution and liquid propylene was fed into the reactor prior to the addition of the catalyst solutions. In all experiments, the reactor was first washed with toluene and then dried with nitrogen purge at 150° C. for one hour. Afterward, 1 ml toluene solution of TIBAL (triisobutylaluminum, CAS #100-99-2, Sigma Aldrich), as a scavenger, was charged into the reactor before the addition of isohexane solvent. Ethylene, propylene, and isohexane were obtained from commercial operations and were purified over beds of alumina and molecular sieves. Experiments with varying ethylene pressures were conducted by co-feeding both catalysts simultaneously at 90° C.

A first catalyst system (Catalyst 1), which was used for synthesizing low MW vinyl-terminated polyethylene copolymer, included 6,6'-((ethane-1,2-diylbis (methylazanediyl) bis(methylene)) bis(2-(9H-carbozol-9-yl)-4-methylphenoxide) zirconium dibenzyl activated with dimethylanilinium tetrakis(pentafluorophenyl) borate. The second catalyst system (Catalyst 2), which was used for synthesizing the comb polyolefin (i.e., for incorporating vinyl-terminated polyethylene copolymers with propylene), included rac-dimethylsilyl (4-O-biphenyl-2-n-hexyl-indenyl) (2-methyl-4-(3',5'-di-tert-butyl-4'-methoxy-phenyl)-indenyl) zirconium dimethyl activated with dimethyl anilinium tetrakis(pentafluorophenyl) borate. Both catalysts were dissolved in toluene. A 1.7 molar ratio of Catalyst 2 to Catalyst 1 was used in all experiments.

Experiment I

In a first experiment, Catalyst 1 and Catalyst 2 were prepared and pre-combined to form a catalyst solution that was added to the reactor containing the ethylene, propylene, and isohexane. Polymerization began immediately upon addition of the catalyst solution, and it was allowed to continue under controlled temperature for 30 minutes. Afterward, the reactor was allowed to reach room temperature and was depressurized by venting. The polymerization solution was poured into an aluminum tray. The polymer was collected and allowed to dry over 16 hours under ambient condition. The polymer was further dried under vacuum at 60° C.

Figure 2:
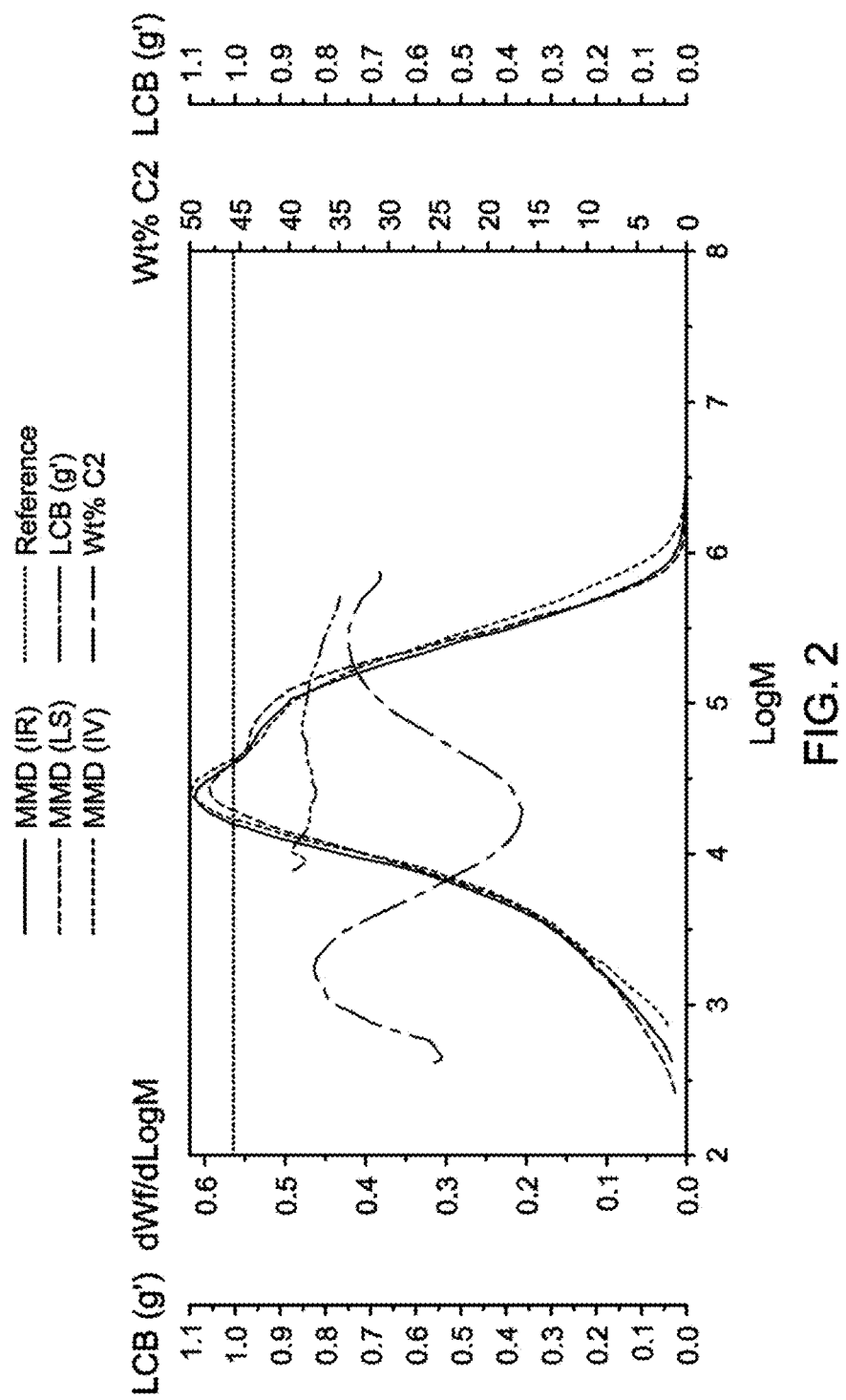
FIG. 2 is GPC-4D plot of the polymer product identified as Example 1 described herein.

As shown in FIG. 2, the polymer product (Example 1) included three polymer populations; i.e., the polymer product included (i) a polyolefin with low molecular weight vinyl-terminated polyethylene copolymer of about 3,000 g/mole with an ethylene content of about 40 wt %; (ii) a moderate molecular weight propylene copolymers of about 25,000 g/mole with an ethylene content about 15 wt %; and (iii) a higher molecular weight comb polyolefin of about 100,000 g/mole with an ethylene content of about 35 wt %.

Based upon an analysis of FIG. 2, it was concluded that the ethylene and propylene simultaneously polymerized to form low molecular weight fractions at relatively high levels compared to the comb polyolefin. It is believed that this result was caused by the simultaneous introduction of the first and second catalyst systems.

Experiment II

In a second experiment, Catalyst 1 and Catalyst 2 were sequentially added to the reactor containing the ethylene, propylene, and isohexane (i.e., a staged addition of catalysts was implemented). Namely, Catalyst 1 was allowed to synthesize the vinyl-terminated polyethylene copolymers for 10 minutes before the addition of Catalyst 2.

Figure 3:
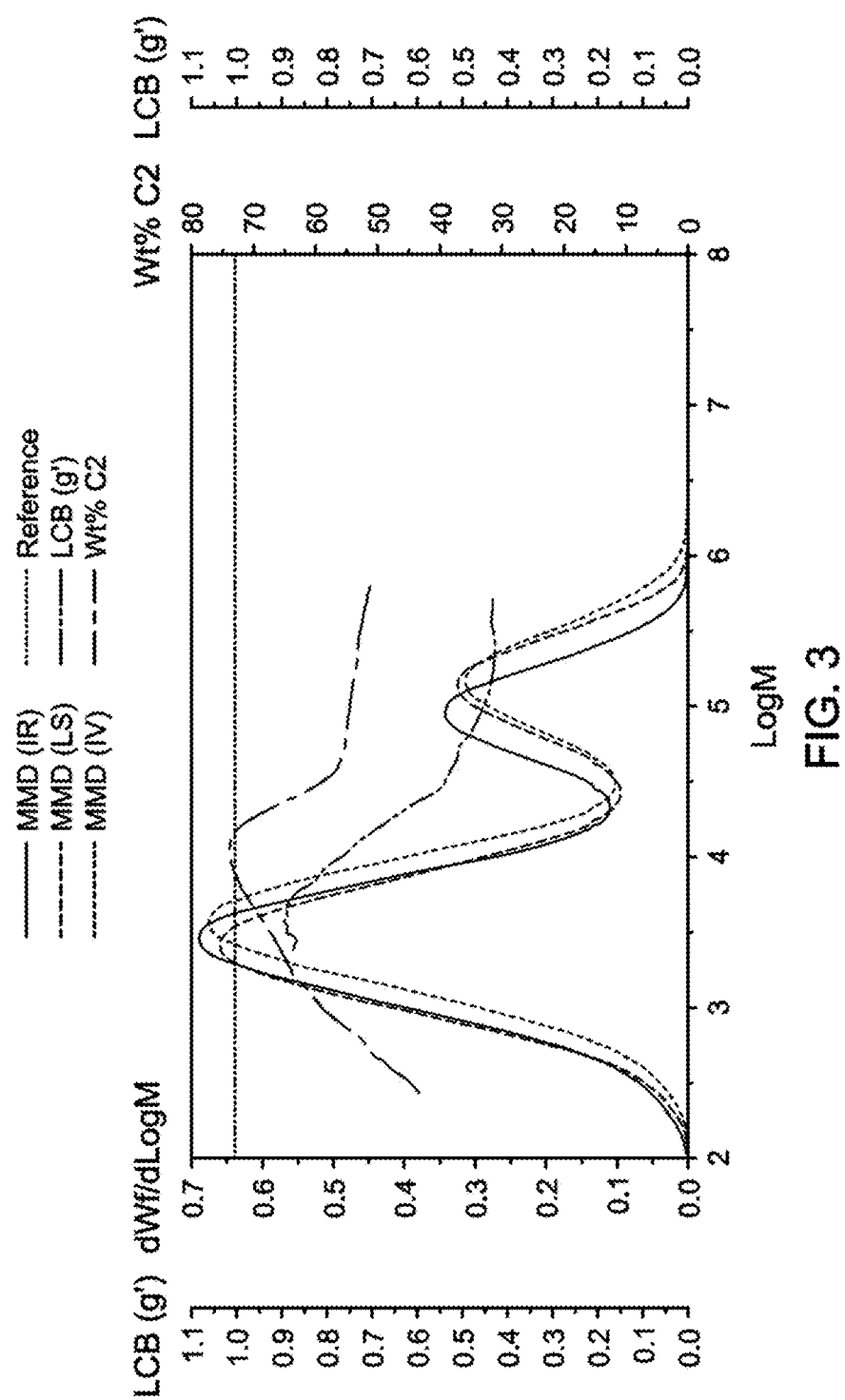
FIG. 3 is GPC-4D plot of the polymer product identified as Example 2 described herein.

As shown in FIG. 3, the polymer product (Example 2) was generally bimodal and included a first fraction with about 70 wt % vinyl-terminated polyethylene copolymers of about 3,000 g/mole with an ethylene content about 72 wt %, and about 30 wt % comb polyolefin of about 100,000 g/mole with an ethylene content about 55 wt %.

Based upon an analysis of FIG. 3, it was concluded that the ethylene monomer concentration in solution (which is a function of the ethylene pressure), was too low such that insufficient vinyl-terminated polyethylene was synthesized in 10 minutes prior to the introduction of Catalyst 2, and therefore there was insufficient vinyl-terminated polyethylene to incorporate into the comb polyolefin. In other words, the continued synthesis of the vinyl-terminated polyethylene after the addition of Catalyst 2, combined with insufficient concentration of vinyl-terminated polyethylene copolymers generated prior to the addition of Catalyst 2, limited the incorporation probability of the vinyl-terminated polyethylene in to the comb polyolefin.

Experiment III

In a third experiment, Catalyst 1 and Catalyst 2 were sequentially added to the reactor containing the ethylene, propylene, and isohexane (i.e. a staged addition of catalysts was implemented) as in the second experiment. The ethylene pressure, however, was increased to provide a higher concentration of ethylene in solution during the first 10 minutes of the polymerization where Catalyst 1 synthesized vinyl-terminated polyethylene.

Figure 4:
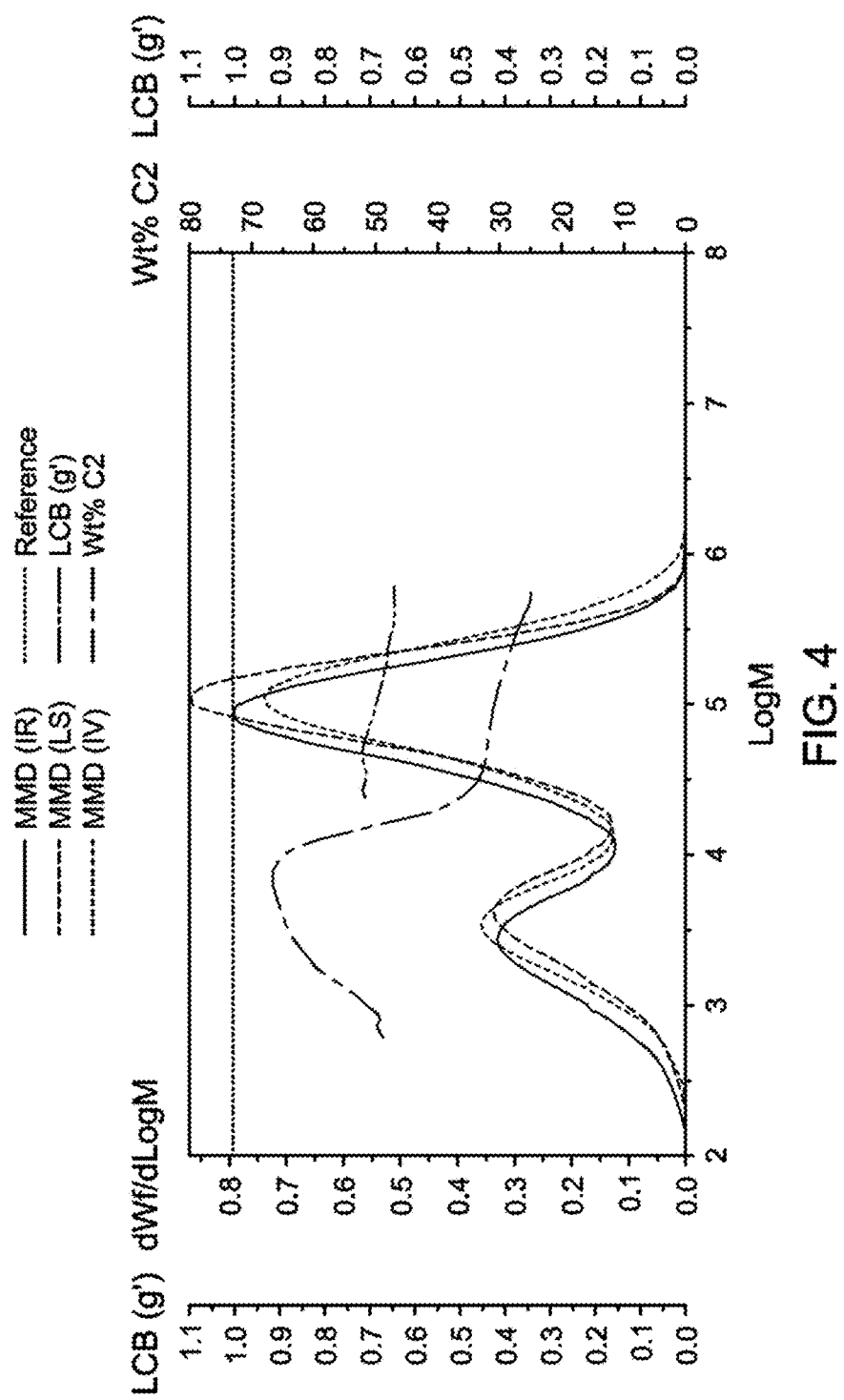
FIG. 4 is a GPC-4D plot of the polymer product identified as Example 3 described herein.
Figure 5:
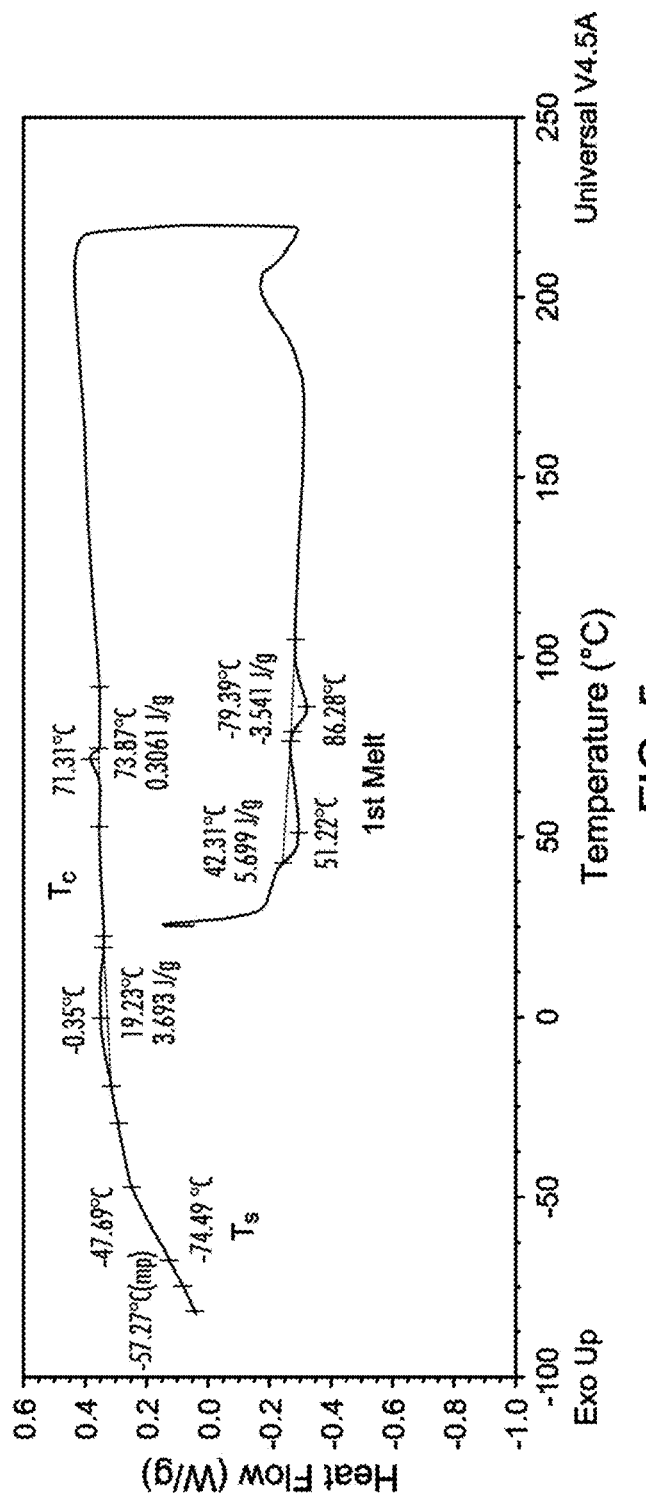
FIG. 5 is a DSC thermogram of the polymer product identified as Example 3 described herein.

As shown in FIG. 4, the polymer product (Example 3) was generally bimodal and included a first fraction of about 30 wt % vinyl terminated ethylene copolymers of about 3,000 g/mole and an ethylene content of about 65 wt %, and about 70 wt % comb polyolefin of about 100,000 g/mole with an ethylene content of about 30 wt %. The overall averaged ethylene content for this bimodal polymer product, which was determined by $^{13}C$ NMR, was 45 wt %, and the propylene sequences contained 43% isotactic triad. The polymer product has two melting peaks, as shown in FIG. 5, one corresponding to the ethylene copolymer comb arms (i.e., the VTPs) and the other corresponding to the propylene copolymer backbone. The polymer product also shows two crystallization peaks during cooling at 10° C./min using DSC. The appearance of these crystallization peaks suggests this material may be pellet stable, i.e. that it can crystallize in a waterbath during extrusion pelletization and prevent pellet agglomeration after pelletization.

Figure 6:
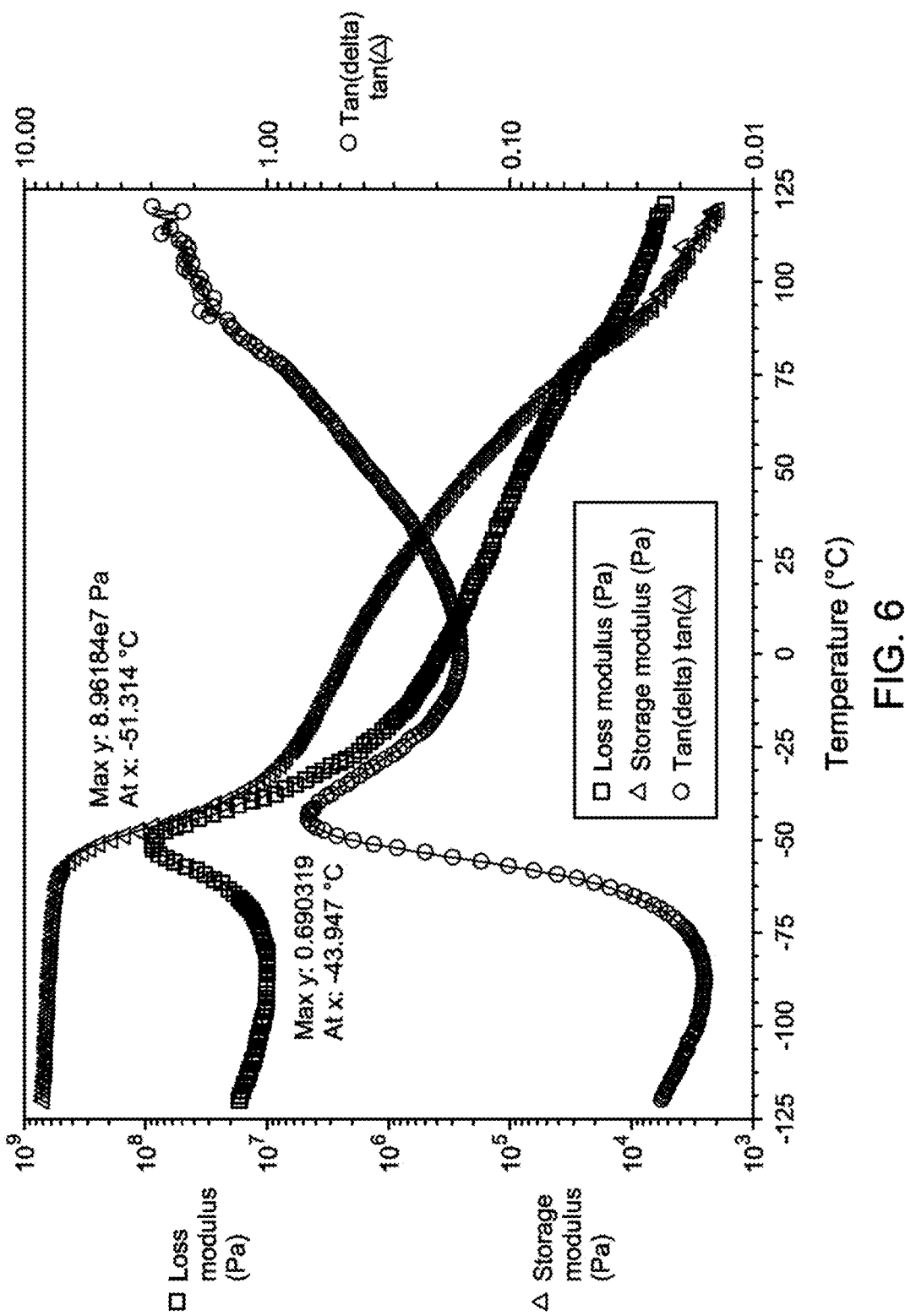
FIG. 6 is a plot showing the dynamic tensile mechanical properties of the polymer product identified as Example 3 described herein.

Dynamic mechanical properties of this polymer product (Example 3) were measured using a DMTA (dynamic mechanical tensile tester) at 1 Hz and 0.1% strain. As shown in FIG. 6, the dynamic tensile modulus was about 1 MPa at 25° C. (below the 3 MPa requirement) and arrived at 0.2 MPa at 50° C. The material exhibited exceptional adhesive characteristic. The material was tacky by touch. The tensile modulus of Example 3 (ASTM D790) was 5 MPa and its tensile strength was 0.5 MPa with 234% elongation to break (ASTM D638).

Figure 7A:
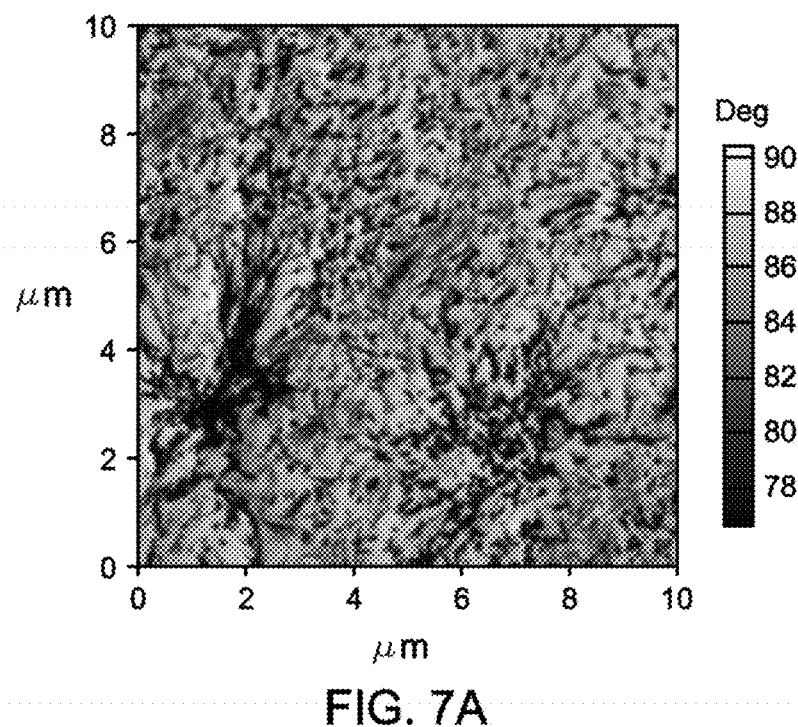
FIG. 7A is a second phase bimodal AFM image of the polymer product identified as Example 3 described herein.
Figure 7B:
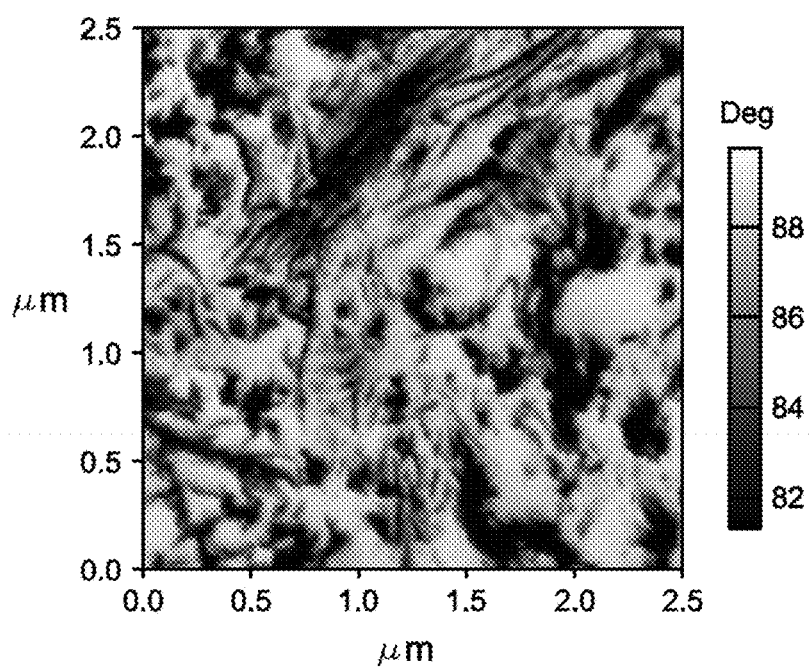
FIG. 7B is a second phase bimodal AFM image of the polymer product identified as Example 3 described herein.
Figure 7C:
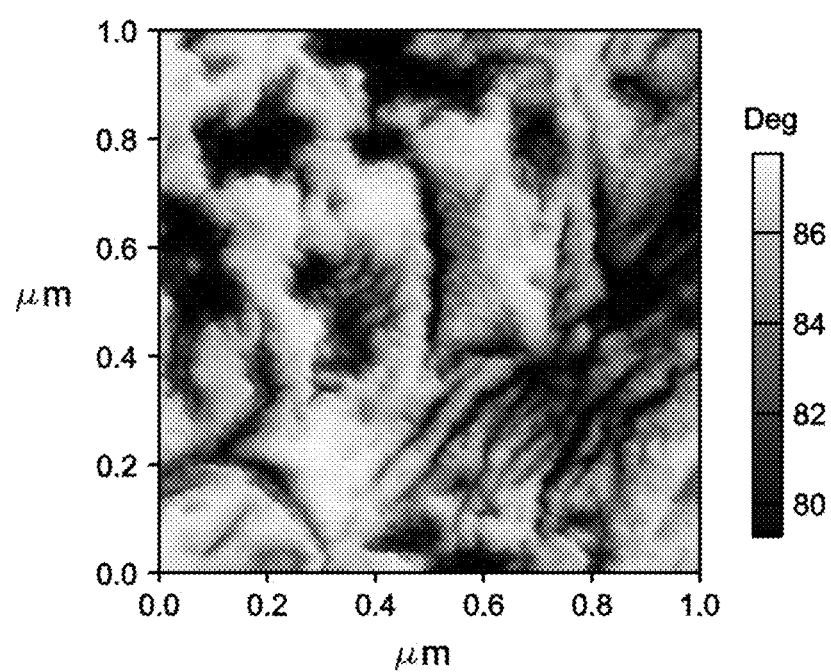
FIG. 7C is a second phase bimodal AFM image of the polymer product identified as Example 3 described herein.
Figure 8:
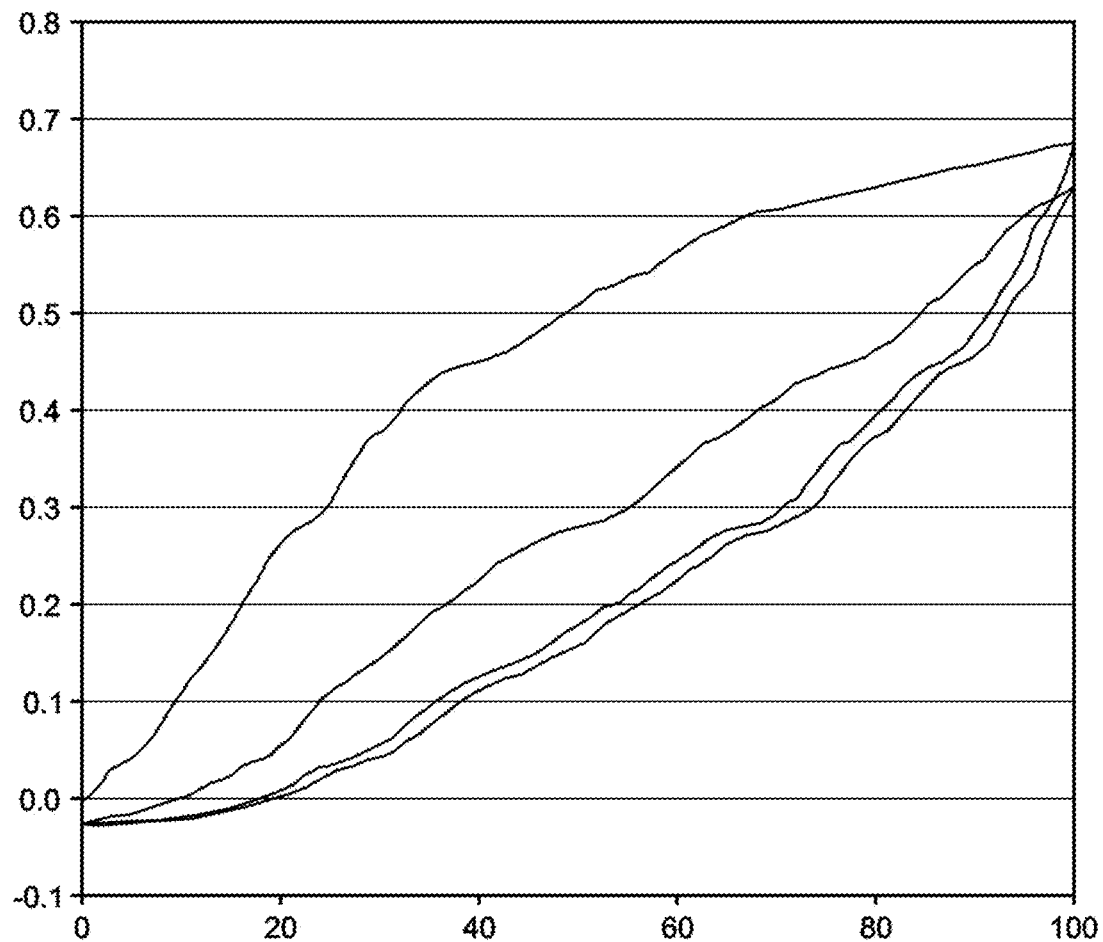
FIG. 8 is a chart showing the loading and unloading deformation of the polymer product identified as Example 3 described herein.

The polymer product of Example 3 was cryo-faced at −120° C. using a Leica microtome and examined by bimodal AFM (Cypher AFM, Asylum Research). As shown in FIGS. 7A-C, both black cross-hatch PP crystals and orange PE crystals can be seen. In few cases, the connection of the comb arm PE crystals to the backbone PP crystals is indicated suggesting that the comb block copolymers were synthesized. Additionally, this extensive crystal network indicates potential good elastic properties. A Fontijne melt vacuum press was used to mold a 2 mm thick plaque of the sample. The temperature was ramped up to 170° C. and held for 5 minutes followed by 5 minutes under compression before cooling to room temperature. ASTM type 3 dog bones were punched out using a clicker press. An Instron tensile tester was used for the mechanical tests. The sample was placed in the grips with a 35-mm grip separation. Slack was manually removed so that the reading on the instrument registers a positive tensile force before starting the test. The sample was stretched to a 100% extension at 100 mm/minute. The crosshead returns to 0% extension and repeats this cycle once more. Due to the tackiness of the sample, wavy loading and unloading curves were resulted as shown in FIG. 8. The loading and unloading stresses were below 1 MPa with the first set below 20% and the second set below 10.

Figure 9:
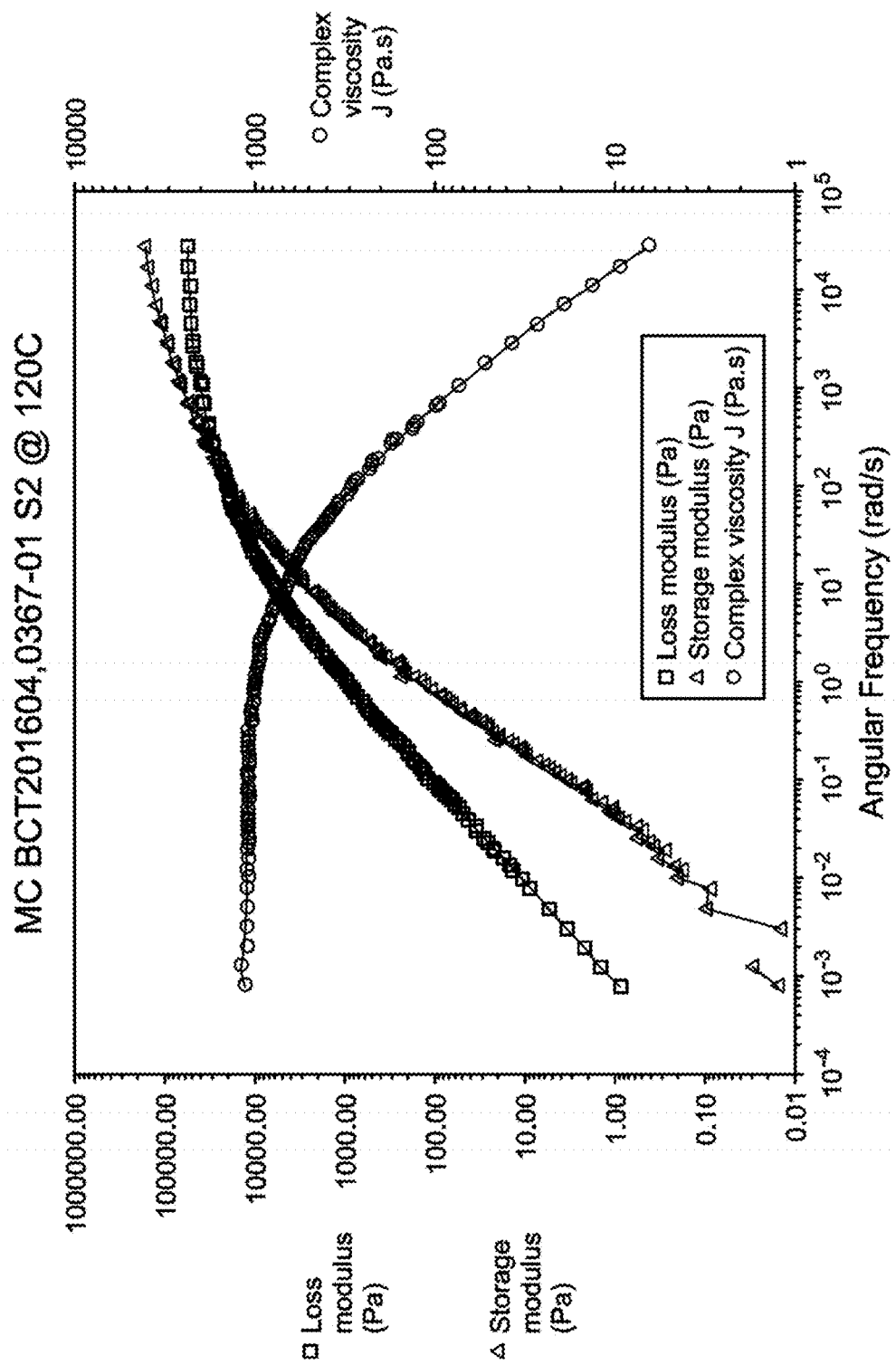
FIG. 9 is a chart showing the shear rheological curve of the polymer product identified as Example 3 described herein.
Figure 10:
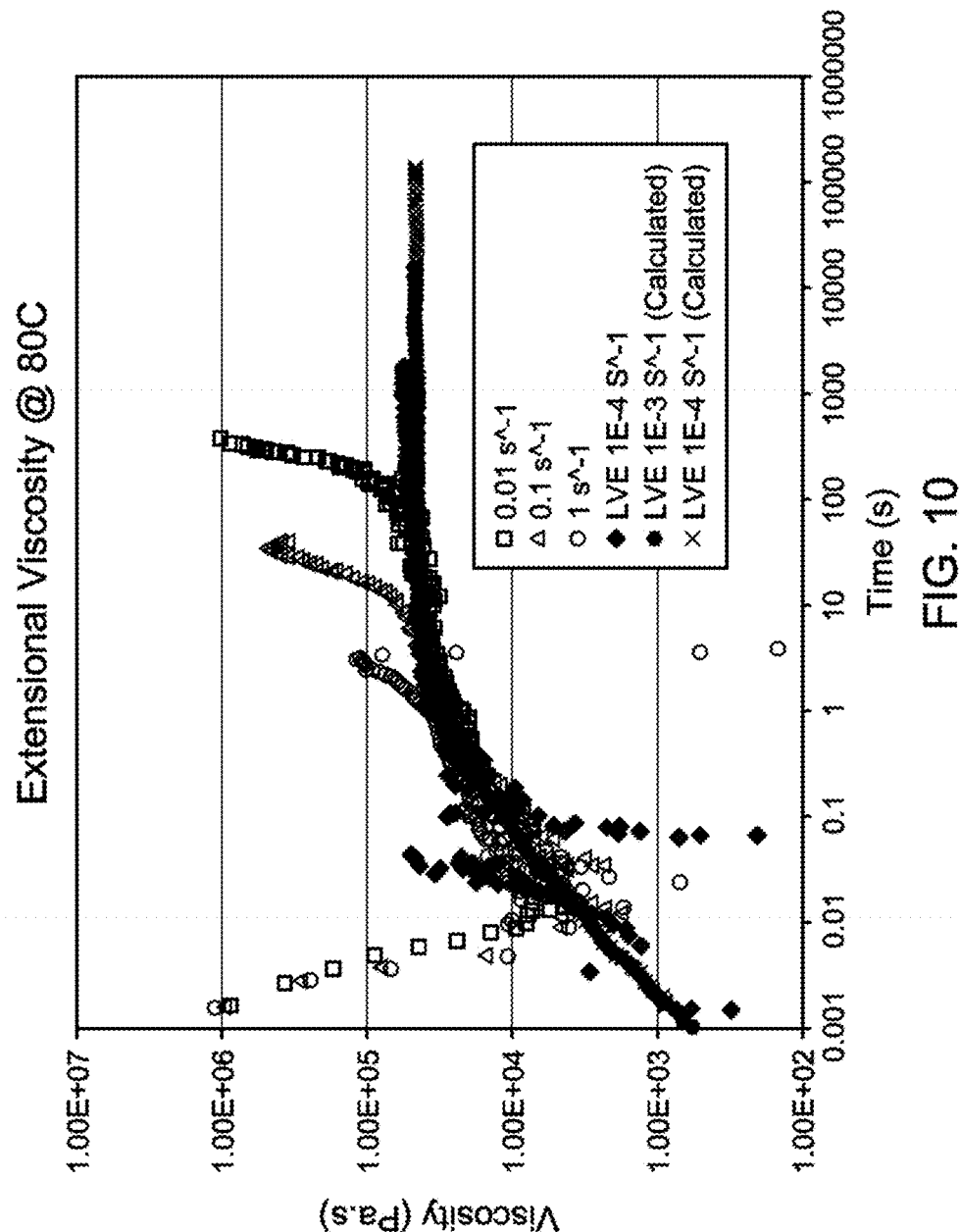
FIG. 10 is a chart showing the extensional rheological curve of the polymer product identified as Example 3 described herein.

Both shear and extensional rheological properties of the polymer product of Example 3 were measured using SAOS/TTS (small angle oscillatory shear/time temperature superposition) and SER (Sentmanat extension rheometer). Results are shown in FIGS. 9 and 10, respectively. As indicated from FIG. 9, due to its relatively higher molecular weight comparing with common adhesives, Example 3 has a good zero-shear-rate viscosity value of 1,100 Pa·s. Due to its branching nature, Example 3 exhibits excellent extensional flow hardening behavior at all extensional strain rates as shown in FIG. 10. These suggest that Example 3 can be processed easily and has excellent processability.

While the sequential addition of the catalyst systems and increased concentration of ethylene in the first polymerization mixture gave the desired results within this experiment, the skilled person will appreciate that the advantageous balance of VTP and comb polyolefin obtained in this experiment could have also been achieved by manipulating other parameters of the synthesis. As explained in greater detail herein, the balance between the VTP and comb polyolefin can be readily adjusted by manipulating several parameters such as catalyst and activator selection, residence time, and polymerization conditions such as temperature and pressure. These particular experiments, therefore, should not be viewed as limiting practice of the present invention.

Various modifications and alterations that do not depart from the scope and spirit of this invention will become apparent to those skilled in the art. This invention is not to be duly limited to the illustrative embodiments set forth herein.

What is claimed is:

1. A composition comprising:
   (i) from about 5 to about 50 wt % of a vinyl-terminated polyethylene having an Mn from about 200 g/mol to about 10,000 g/mol; and
   (ii) from about 50 to about 95 wt % of a comb polyolefin having polyethylene arms attached to a random copolymer backbone, said backbone including a majority of units derived from propylene, as determined by molar percentage of units,
       wherein the polyethylene arms have an Mn from about 200 g/mol to about 10,000 g/mol, and
       wherein the comb polyolefin has an Mp from about 7,500 to about 400,000 g/mol.

2. The composition of claim 1, where the vinyl-terminated polyethylene have an Mn from about 1500 g/mol to about 6,000 g/mol.

3. The composition of claim 1, where the comb polyolefin has an Mp from about 20,000 to about 200,000.

4. The composition of claim 1, where the backbone further includes units derived from ethylene.

5. The composition of claim 1, where the comb polyolefin is a random copolymer including units derived from vinyl-terminated polyethylene, from ethylene, and from propylene.

6. The composition of claim 1, where the composition includes from about 15 to about 40 wt % of the vinyl-terminated polyethylene and from about 60 to about 85 wt % of the comb polyolefin.

* * * * *